(12) United States Patent
Yamaguchi et al.

(10) Patent No.: US 8,384,633 B2
(45) Date of Patent: Feb. 26, 2013

(54) OPTICAL WRITING DISPLAY APPARATUS, OPTICAL WRITING APPARATUS AND OPTICAL WRITING METHOD

(75) Inventors: Yasuhiro Yamaguchi, Kanagawa (JP); Tomozumi Uesaka, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 973 days.

(21) Appl. No.: 12/432,195

(22) Filed: Apr. 29, 2009

(65) Prior Publication Data
US 2010/0002155 A1 Jan. 7, 2010

(30) Foreign Application Priority Data

Jul. 1, 2008 (JP) ................................. 2008-172314

(51) Int. Cl.
*G09G 3/34* (2006.01)
(52) U.S. Cl. ............... 345/84; 345/204; 345/87; 345/85; 345/94; 349/25; 349/33
(58) Field of Classification Search ......................... None
See application file for complete search history.

(56) References Cited

U.S. PATENT DOCUMENTS

| | | | |
|---|---|---|---|
| 5,327,263 A * | 7/1994 | Katagiri et al. ............... 358/471 |
| 5,514,504 A * | 5/1996 | Iijima et al. ...................... 430/20 |
| 6,268,840 B1 * | 7/2001 | Huang ............................. 345/94 |
| 6,373,457 B1 * | 4/2002 | Kim et al. ........................ 345/95 |
| 6,950,086 B2 * | 9/2005 | Nagai et al. ..................... 345/95 |
| 7,167,168 B2 * | 1/2007 | Nose et al. ..................... 345/204 |
| 8,054,260 B2 * | 11/2011 | Gan et al. ......................... 345/87 |
| 8,149,192 B2 * | 4/2012 | Ishii et al. ........................ 345/84 |
| 2002/0005827 A1 | 1/2002 | Kobayashi |
| 2004/0119933 A1 * | 6/2004 | Harada et al. ................. 349/175 |
| 2007/0008262 A1 * | 1/2007 | Harada et al. ................... 345/87 |
| 2008/0180583 A1 * | 7/2008 | Harada et al. ................... 349/12 |
| 2008/0239174 A1 * | 10/2008 | Ishii et al. ....................... 349/12 |

FOREIGN PATENT DOCUMENTS

| | | |
|---|---|---|
| JP | A-2001-356320 | 12/2001 |
| JP | A-2002-337393 | 11/2002 |
| JP | A-2004-12569 | 1/2004 |
| JP | A-2005-196062 | 7/2005 |
| JP | A-2007-279371 | 10/2007 |

* cited by examiner

*Primary Examiner* — William Boddie
*Assistant Examiner* — Christopher Thompson
(74) *Attorney, Agent, or Firm* — Oliff & Berridge, PLC

(57) ABSTRACT

An optical writing display apparatus that performs: applying to a pair of electrodes a first voltage having a first polarity that applies a first partial voltage to a cholesteric liquid crystal layer, the first partial voltage being more than a threshold at which the state of the cholesteric liquid crystal layer changes from focal conic to homeotropic when the exposure is conducted, and exposing an photoconductive layer to light; stopping applying the first voltage for a predetermined time and exposing the photoconductive layer to light; applying a second voltage having a second polarity opposite to the first polarity that applies a second partial voltage to the cholesteric liquid crystal layer, the second partial voltage being not more than the above threshold when the exposure is not conducted, but more than the above threshold when the exposure is conducted; and selectively exposing the photoconductive layer to light and stopping applying the second voltage.

7 Claims, 10 Drawing Sheets

FIG. 4A PLANAR
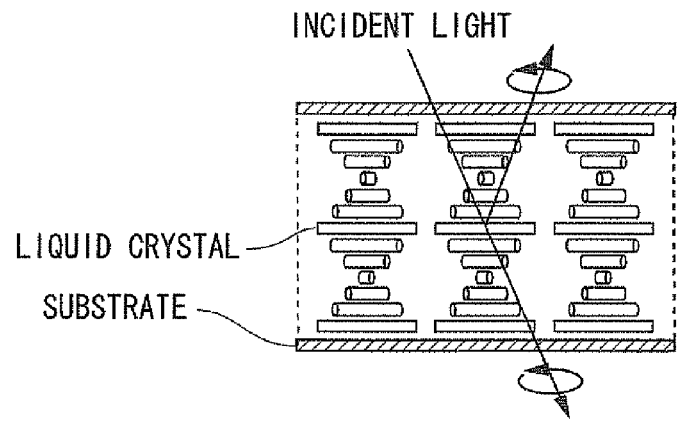
FIG. 4B FOCAL CONIC
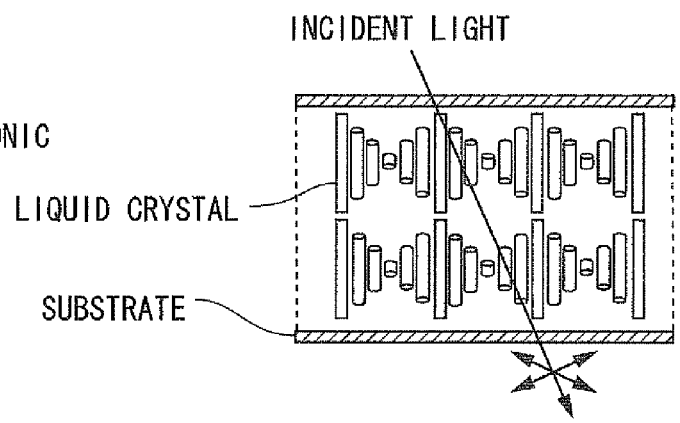
FIG. 4C HOMEOTROPIC
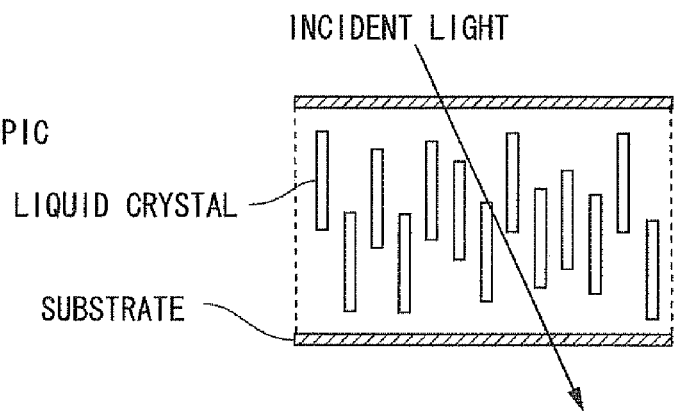

VOLTAGE WAVEFORM OF LC PARTIAL VOLTAGE

OPTICAL WRITING DISPLAY APPARATUS, OPTICAL WRITING APPARATUS AND OPTICAL WRITING METHOD

CROSS-REFERENCE TO RELATED APPLICATION

This application is based on and claims priority under 35 USC 119 from Japanese Patent Application No. 2008-172314 filed Jul. 1, 2008.

BACKGROUND

1. Technical Field

The present invention relates to an optical writing display apparatus, an optical writing apparatus, and an optical writing method.

2. Background Art

An optical writing display device displays an image by applying a predetermined voltage to a display device, and controlling a voltage or an electric current applied to the display device by changing the impedance of an optical switching device according to an amount of received light. In particular, optical writing display media, which include a display layer having a memory property and a photoconductive switching layer laminated on the display layer, perform writing upon application of a voltage and an optical image. These media have attracted attention as electronic paper media that can be separated from a writing apparatus and carried.

Examples of a display device having a memory property for the optical writing display medium include polymer-dispersed liquid crystal devices, cholesteric liquid crystal devices, ferroelectric liquid crystal devices, electrophoresis devices, electriefield ball rotation devices, toner display devices, and devices encapsulating these devices.

Examples of an optical switching device capable of controlling a voltage or a current according to an amount of light received include amorphous silicon devices used in electrophotography, photoconductive devices having a function-separated double-layer structure formed from organic photoconductors, and photoconductive devices having a structure in which a charge transporting layer (CTL) is sandwiched between charge generating layers (CGLs) (hereinafter, referred to as a dual-CGL structure). In particular, since photoconductive devices can be produced without a high temperature heating process, they can be formed on a flexible substrate such as a PET film, and since they can be produced without a vacuum process, they can be manufactured at a low cost.

Display devices that use a cholesteric liquid crystal that has a memory property as a material for a displaying layer have also been considered. A cholesteric liquid crystal, which has a helical structure, exhibits a selective reflection phenomenon in which incident light parallel to a helical axis is separated into right-hand circular polarized light and left-hand circular polarized light, and of these, the circular polarization component that coincides with the rotation direction of the helix is Bragg-reflected, while the other is transmitted. The center wavelength $\lambda$ and reflected wavelength width $\Delta\lambda$ of the reflected light are expressed as $\lambda = n \times p$ and $\Delta\lambda = \Delta n \times p$, respectively, where p is the helical pitch, n is the average refractive index in a plane perpendicular to the helical axis, and $\Delta n$ is the birefringence of the cholesteric liquid crystal. Therefore, light reflected from a cholesteric liquid crystal layer exhibits vivid colors in accordance with the helical pitch.

The cholesteric liquid crystal exhibits the following three states: a planar state in which the helical axis is perpendicular to the surface of a cell and the above-described selective reflection phenomenon of incident light is caused (FIG. 4A); a focal conic state in which the helical axis is substantially parallel to the surface of a cell and incident light is transmitted with a slight forward scattering (FIG. 4B); and a homeotropic state in which the helical structure is unraveled and the liquid crystal director faces in the electric field direction, thereby almost completely transmitting incident light (FIG. 4C).

Among the above three states, the planar state and focal conic state are states of a bistable liquid crystal when no voltage is applied thereto. Consequently, the orientation of cholesteric liquid crystal is not determined only by the level of voltage applied to the liquid crystal layer. When the planar state is the initial state, the liquid crystal changes from a planar state to a focal conic state to a homeotropic state, in that order, as the applied voltage increases, and when a focal conic state is the initial state, the liquid crystal changes from a focal conic state to a homeotropic state as the applied voltage increases.

When the voltage applied to the liquid crystal layer is immediately decreased to zero, the planar state and the focal conic state remain in their respective states, but the homeotropic state changes to the planar state.

Consequently, when voltage is immediately decreased to zero after applying a voltage to the cholesteric liquid crystal layer, the cholesteric liquid crystal layer exhibits a switching behavior as shown in FIG. 5. If voltage is decreased to zero when the partial voltage applied to the liquid crystal layer is Vfh (upper threshold) or more, the liquid crystal is in a selective reflection state in which the homeotropic state has changed to the planar state. If voltage is decreased to zero when the partial voltage is between Vpf (lower threshold) and Vfh, the liquid crystal is in a transmitting state resulting from the focal conic state. If voltage is decreased to zero when the partial voltage is Vpf or less, the liquid crystal maintains its state prior to application of the voltage, namely, the selective reflection state resulting from the planar state or the transmitting state resulting from the focal conic state.

Monochrome optical writing electronic papers, which display a black image on a white background and have been recently developed, include a display medium composed of, between a pair of electrodes, a display layer formed from a liquid crystal layer and a photoconductive layer formed from a photoconductor layer, laminated so as to sandwich a light-shielding layer or the like. In this display medium, a desired image is recorded by exposing the surface of the photoconductive layer side of the display medium to light while applying a predetermined voltage to the pair of electrodes. Specifically, while applying a predetermined voltage to the pair of electrodes, exposure to light is performed, and thereby a photocurrent flows to the photoconductive layer and increases the partial voltage applied to the exposed portion of the cholesteric liquid crystal layer, which changes to a homeotropic state. When the application of the voltage is stopped, the state of the exposed portion changes to a planar state. In this way, an image is written at the display medium.

In the above case, when a voltage is applied between the electrodes, positive holes generated in the charge generating layer of the photoconductive layer move through the charge transporting layer due to the effect of an electric field. Under ideal conditions, positive holes disappear when the voltage application is stopped. However, there are cases in which the positive holes do not disappear because some of these are captured at a trap level, thereby generating a residual potential due to the remaining charges. The effect of the residual potential may prevent the cholesteric liquid crystal layer from changing its state in a desired manner, and satisfactory image writing may not be performed.

SUMMARY

According to an aspect of the invention, there is provided an optical writing display apparatus comprising:

a display medium comprising, between a pair of electrodes, a photoconductive layer comprising a first charge generating layer, a charge transporting layer and a second charge generating layer, and a cholesteric liquid crystal layer;

a voltage application unit that applies a voltage to the pair of electrodes;

an exposure unit that exposes the photoconductive layer to an exposure light; and a control unit that performs:

a first initialization process including controlling the voltage application unit to apply a first voltage having a first polarity to the pair of electrodes, the first voltage applying a first partial voltage to the cholesteric liquid crystal layer, the first partial voltage being more than a threshold at which the state of the cholesteric liquid crystal layer changes from focal conic to homeotropic when the exposure is conducted, and controlling the exposure unit to irradiate the photoconductive layer with the exposure light;

a second initialization process including controlling the voltage application unit to stop the application of the first voltage to the pair of electrodes for a predetermined time and controlling the exposure unit to expose the photoconductive layer while the application of the first voltage is stopped; and an image writing process including controlling the voltage application unit to apply to the pair of electrodes a second voltage having a second polarity opposite to the first polarity, the second voltage applying a second partial voltage to the cholesteric liquid crystal layer, the second partial voltage being not more than a threshold at which the state of the cholesteric liquid crystal layer changes from focal conic to homeotropic when the exposure is not conducted, but more than the threshold when the exposure is conducted, controlling the exposure unit to selectively irradiate with the exposure light a portion of the photoconductive layer corresponding to a portion of the cholesteric liquid crystal layer on which an image is to be formed or an image is not to be formed, and controlling the voltage application unit to stop the application of the second voltage to the pair of electrodes.

BRIEF DESCRIPTION OF THE DRAWINGS

Exemplary embodiments of the present invention will be described in detail based on the following figures, wherein:

FIG. 4A is an explanatory schematic diagram showing the relationship between the molecular orientation and optical characteristics of a cholesteric liquid crystal in a planar state;

FIG. 4B is an explanatory schematic diagram showing the relationship between the molecular orientation and optical characteristics of a cholesteric liquid crystal in a focal conic state;

FIG. 4C is an explanatory schematic diagram showing the relationship between the molecular orientation and optical characteristics of a cholesteric liquid crystal in a homeotropic state;

DETAILED DESCRIPTION

In the following, an exemplary embodiment of the optical writing display apparatus and the optical writing method according to the present invention will be described with reference to FIG. 1.

Figure 1:
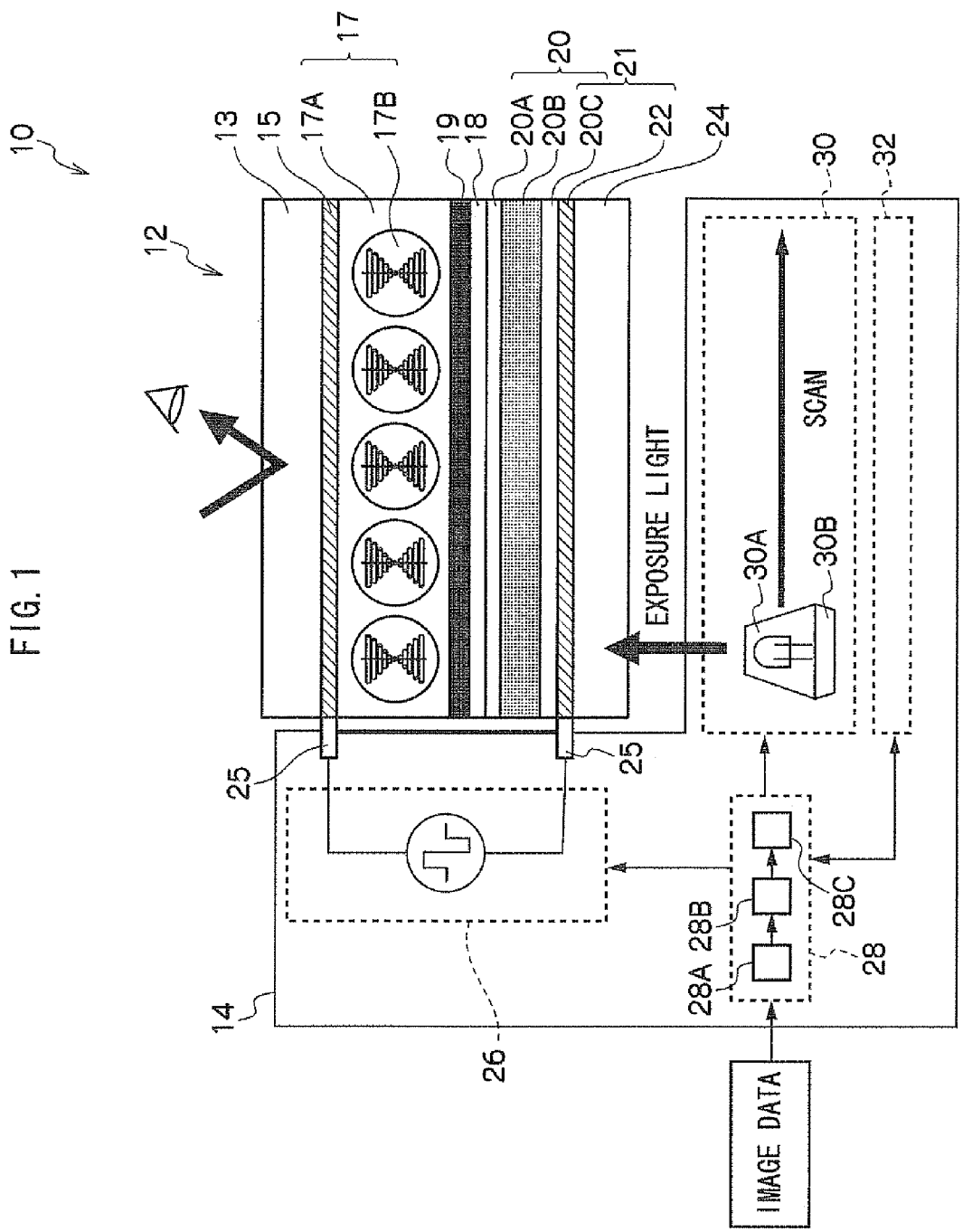
FIG. 1 is a schematic diagram showing one exemplary embodiment of the optical writing display apparatus according to the invention.

As shown in FIG. 1, an optical writing display apparatus 10 of an exemplary embodiment of the invention includes a display medium 12 and a writing unit 14.

In this exemplary embodiment, display medium 12 includes a substrate 13, an electrode 15, a liquid crystal layer 17, an optical absorption layer 19, a laminate layer 18, a photoconductive layer (photoconductor layer, having a dual CGL structure) 20, an electrode 22, and a substrate 24, which are layered in this order from the display surface side.

Substrates 13 and 24 are members that hold the functional layers between the substrates so as to maintain the structure of display medium 12. Substrates 13 and 24 are sheet-shaped objects having a strength that is enough to withstand an external force. Substrate 13, provided on the display surface side, transmits at least incident light, and substrate 24, provided on the side opposite to the display surface, transmits at least exposure light which will be described later. Substrates 13 and 24 nay have flexibility.

Specific examples of the material for substrates 13 and 24 include inorganic material sheets (e.g. glass or silicon) and polymeric films (e.g. polyethylene tereplithalate (PET), polysulfone, polyether sulfone (PES), polycarbonate (PC), polyethylene naphthalate, polyethylene, polystyrene and polyimide). In the exemplary embodiment, since an organic material is used for the photoconductive layer (including a charge generating layer and a charge transporting layer), heat treatment at high temperature does not need to be conducted. Therefore, a light-transmissive polymeric film substrate, which can provide a flexible substrate and is easy to form at low cost, may be used in the invention.

The thickness of substrates 13 and 24, respectively, is preferably 50 μm or more and 500 μm or less.

Electrodes 15 and 22 are members that uniformly apply a voltage that has been applied from writing unit 14 (which will be described later) to each of the functional layers in display medium 12. Therefore, electrodes 15 and 22 have an in-plane uniform electrical conductivity. Electrode 15, provided on the display surface side, transmits at least incident light, and electrode 22, provided on the side opposite to the display surface, transmits at least exposure light which will be described later. In the exemplary embodiment, the term "conductive" or "conductivity" means that the sheet resistance is 500 Ω/square or less.

Examples of electrodes 15 and 22 include conductive films formed from a metal (e.g. gold and aluminum), a metallic oxide (e.g. indium oxide, tin oxide and indium tin oxide (ITO)), and a conductive organic polymer (e.g. polythiophene-based polymer and poly aniline-based polymer). On the foreside and/or the backside of electrodes 15 and 22, a known functional film such as an adhesion improvement film, an anti-reflection film, or a gas barrier film may be optionally formed.

Electrodes 15 and 22 may be formed on substrates 13 and 24 by sputtering, or other formation processes such as printing, CVD, or vapor deposition.

Photoconductive layer (photoconductor layer) 20, provided between electrodes 15 and 22, is a layer that exhibits internal photoelectric effects and shows a distribution of electrical characteristics in response to the distribution of intensity of an exposure light due to the changes in impedance characteristics in response to the irradiation intensity of the exposure light.

In the exemplary embodiment, as shown in FIG. 1, photoconductive layer 20 has a dual-CGL structure in which a charge generating layer (CGL) 20A, a charge transporting layer (CTL) 20B, and a charge generating layer (CGL) 20C are stacked in this order from the display surface side.

Charge generating layer 20A has a function of absorbing exposure light to generate charges. Therefore, the term "exposure light" refers to light in a wavelength region which is absorbed by charge generating layer 20A of photoconductive layer 20. An example of charge generating layer 20A is a layer which absorbs the exposure light to generate excitons (a pair of electron and hole), and efficiently separates the excitons into free carriers in charge generating layer 20A, or at the interface of charge generating layer 20A and charge transporting layer 20B.

Examples of the material for charge generating layer 20A include charge generating materials dispersed in a binder resin. Suitable examples of the charge generating material include metallic or non-metallic phthalocyanine pigments and polycyclic quinone pigments such as squarylium pigments, azulenium pigments, perylene pigments, indigo pigments, bisazo pigments, trisazo pigments, quinacridone pigments, pyrrolo pyrrole pigments, or dibromo anthanthrone pigments. Among these, preferable charge generating materials are those including one or more selected from chlorogallium phthalocyanine, hydroxygallium phthalocyanine and titanylphthalocyanine as a main component.

Particularly preferable hydroxygallium phthalocyanines are those having a crystal structure which shows intense diffraction peaks at Bragg angles (2θ±0.2°) in an X-ray diffraction spectrum of: (i) 7,5°, 9.9°, 12.5°, 16.3°, 18.6°, 25.1° and 28.3°; (ii) 7.7°, 16.5°, 25.1° and 26.6°; (iii) 7.9°, 16.5°, 24.4° and 27.6°; (iv) 7.0°, 7.5°, 10.5°, 11.7°, 12.7°, 17.3°, 18.1°, 24.5°, 26.2° and 27.1°; (v) 6.8°, 12.8°, 15.8° and 26.0°; or (vi) 7.4°, 9.9°, 25.0°, 26.2° and 28.2°, because of their high charge generating efficiency.

Particularly preferable chlorogallium phthalocyanines are those having a crystal structure which shows intense diffraction peaks at Bragg angles (2θ±0.2°) in an X-ray diffraction spectrum of at least 7.4°, 16.6°, 25.5° and 28.3°; 6.8°, 17.3°, 23.6° and 26.9°; or 8.7° to 9.2°, 17.6°, 24.0°, 27.4° and 28.8°, because of their high charge generating efficiency.

Particularly preferable titanylphthalocyanines are those having a crystal structure which shows intense diffraction peaks at Bragg angles (2θ±0.2°) in an X-ray diffraction spectrum of 9.5°, 9.7°, 11.7°, 15.0°, 23,5°, 24.1° and 27.3°, because of their high charge generating efficiency.

Suitable examples of the binder resin that may be used for charge generating layer 20A include polyvinyl acetal resins, polyarylate resins, polyester resins, phenoxy resins, vinyl chloride-vinyl acetate copolymer resins, carboxyl modified vinyl chloride-vinyl acetate copolymer resins, polyamide resins (including nylon resins), acrylic resins, polyacrylamide resins, polyvinyl pyridine resins, cellulosic resins, urethane resins, epoxy resins, casein, polyvinyl alcohol resins, and polyvinyl pyrrolidone resins. Among these, polyvinyl acetal resins and carboxyl modified vinyl chloride-vinyl acetate copolymer resins are preferable from the viewpoint of dispersing the charge generating material therein in a favorable manner.

The mixing ratio of a low molecular compound such as a charge generating material (including a charge transporting material when they are added) to a binder resin (low molecular compound/binder resin) in charge generating layer 20A may be, for example, preferably in the range of 1/10 to 20/1, more preferably in the range of 1/1 to 10/1.

Methods of producing charge generating layer 20A include, in addition to dry film-formation methods such as a vapor deposition method or a sputtering method, methods using a solvent such as a spin coating method, a dip coating method, a blade coating method, a roll coating method, and a spray coating method. In any of the above methods, a process of heating a substrate or a strict control of the process is not necessary, unlike the process of producing a-Si or photodiodes. However, when a charge transporting material as mentioned above is used, it is preferable to produce charge generating layer 20A by a coating method using a solvent, from the viewpoint of convenience of production. The solvent is preferably one that does not damage at least charge transporting layer 20B (e.g., causing swelling or cracks of the charge transporting layer). Thus, the solvent to be used for forming charge generating layer 20A is generally preferably alcohol solvent, ketone solvent, ether solvent, or ester solvent, although it depends on the type of material for charge transporting layer 20B. Generally, effective examples thereof include solvents such as. Among these, solvents having a hydroxyl group in its molecule (e.g., alcohol) are suitable as a solvent for a coating liquid containing a polycarbonate resin as a binder resin, which coating composition is used for forming charge generating layer 20A on charge transporting layer 20B.

In the preparation of a coating composition for forming charge generating layer 20A, a charge generating material as mentioned above and optionally a charge transporting material are added to a solvent (or a solution in which a binder resin is dissolved) at a certain ratio, which is then mixed and dispersed. The method of mixing or dispersing may be selected from ordinary methods using a ball mill, roll mill, sand mill, attritor, ultrasonic waves, or the like. When dispersing the charge generating material, the particle size of the charge generating material may be regulated to 0.5 μm or less, preferably 0.3 μm or less, more preferably 0.15 μm or less.

The concentration of a solid content of the coating composition for forming charge generating layer 20A may be 1% by weight or more and 30% by weight or less. When the content is less than 1% by weight, the obtained thickness may be too small to obtain sufficient electric characteristics. When the content is more than 30% by weight, the viscosity of the composition may be too high to readily form a film. When the content is less than 1% by weight or more than 30% by weight, the state of dispersion of fine particles of the charge generating material may not be stable, thereby aggravating the storage stability or film formation properties of the composition.

The thickness of charge generating layer 20A is preferably 10 nm or more and 1 μm or less, more preferably 20 nm or more and 500 nm or less. When the thickness is less than 10 nm, sensitivity to light may not be sufficient and formation of a uniform film may be difficult. On the other hand, when the thickness is more than 10 μm, sensitivity to light may be saturated and peeling may occur due to an internal stress occurring in the film.

Examples of charge generating layer 20C include those in which a charge generating material is dispersed in a binder resin, as with charge generating layer 20A, and the charge generating material may be selected from those which may be used in charge generating layer 20A.

From the viewpoint of convenience of production, the same kind of charge generating material and binder resin may be used in charge generating layer 20A and charge generating layer 20C. Further, in display medium 12 of the exemplary embodiment, charge generating layer 20C may be formed in contact with electrode 22 and contain the charge generating material dispersed in the binder resin, since a residual potential may be easily generated when a voltage is applied between electrodes 15 and 22 so that positive holes that have been generated at the side of charge generating layer 20A move to the side of charge generating layer 20C through charge transporting layer 20B.

The residual potential (which will be described later) is a potential generated by charges remaining in photoconductive layer 20 due to positive holes that are captured at a trap level and do not disappear (under ideal conditions, positive holes that have been generated in charge generating layer 20A or charge generating layer 20C should disappear when the application of voltage between electrodes 15 and 22 is stopped).

In display medium 12 of the exemplary embodiment, explanation is given based on the assumption that a residual potential is generated when a voltage having a predetermined polarity (corresponding to a first polarity in the optical writing display apparatus of the invention) is applied between electrodes 15 and 22, but not generated when a voltage of a polarity opposite to the above polarity is applied. This is because optical writing display apparatus 10 of the exemplary embodiment may be applicable in display medium 12 in which a residual potential is generated when a voltage having a predetermined polarity is applied between electrodes 15 and 22, and not generated when a voltage having a polarity opposite to the above polarity is applied (details will be described later). However, it should be noted that optical writing display apparatus 10 of the exemplary embodiment is also suitable to an optical writing display medium having a structure in which no residual potential is generated.

From the viewpoint of easy generation of a residual potential, the charge generating material and the binder resin used for charge generating layer 20C may be a phthalocyanine pigment and a polyvinyl acetal resin, respectively.

The mixing ratio of charge generating material and binder resin, the preparation method of a coating composition, the forming method, and the thickness of charge generating layer 20C may be the same as those described concerning charge generating layer 20A.

Charge transporting layer 20B is a layer having a function of allowing charges, which have been injected from charge generating layer 20A or charge generating layer 20C, to drift in the direction of applied electric field. In general, charge transporting layer 20B has a thickness that is several ten times greater than that of charge generating layers 20A and 20C. For that reason, the light-and-dark impedance of the whole structure of photoconductive layer 20 is determined by the capacity of charge transporting layer 20B, the dark current of charge transporting layer 20B, and the electric current that flows into charge transporting layer 20B.

Charge transporting layer 20B includes a charge transporting material, and positive holes may be efficiently injected into charge transporting layer 20B from charge generating layers 20A and 20C (i.e., the ionization potential of charge transporting layer 20B may be close to that of charge generating layer 20A), and the hopping transport of positive holes that have been injected may be as fast as possible. In view of increasing the impedance at the time when not exposed to exposure light, the dark current based on heat carriers may be low.

Examples of the charge transporting material that may be contained in charge transporting layer 20B include benzidine materials, carbazole materials, oxadiazole materials, hydrazone materials, stilbene materials, triphenylamine materials, and triphenylmethlane materials. Most of the aforementioned charge transporting materials exhibit a positive hole transportability, and charge transporting layer 20B in the exemplary embodiment is described as substantially a positive hole transporting layer. However, the invention is not limited thereto.

It is also possible to use a charge transporting polymer which has a molecular structure of the aforementioned charge transporting material in a main or side chain. In particular, charge transporting polymers having a charge transporting molecular structure in a main chain, such as those illustrated in Japanese Patent Application Laid-Open (JP-A) No. 2007-279371, are preferable. When a charge transporting polymer is used as the charge transporting material, a binder resin described below may not be used.

Suitable examples of the binder resin that may be contained in charge transport layer 201B include polycarbonate resins, polyester resins, methacrylic resins, acrylic resins, polyvinyl chloride resins, polyvinylidene chloride resins, polystyrene resins, polyvinyl acetate resins, styrene-butadiene copolymers, vinylidene chloride-acrylonitrile copolymers, vinyl chloride-vinyl acetate copolymers, vinyl chloride-vinyl acetate-maleic anhydride copolymers, silicone resins, silicone alkyd resins, phenol-formaldehyde resins, and styrene-alkyd resins. In particular, when a polycarbonate resin is used as the binder resin for the charge transporting layer, favorable charge transporting characteristics and a balance among strength, flexibility and transparency may be achieved.

The mixing ratio of charge transporting material to binder resin in charge transporting layer 20B (charge transporting material/binder resin) is preferably in the range of 1/10 to 10/1, more preferably in the range of 3/7 to 7/3.

Methods of producing charge transporting layer 20B include, in addition to dry film-forming methods such as a vapor deposition method or a sputtering method, methods using a solvent such as a spin coating method, a dip coating method, a blade coating method, and a roll coating method. When a solvent is used, ordinary organic solvents may be used alone or in combination of two or more kinds, and examples thereof include aromatic hydrocarbons such as benzene, toluene, xylene and chlorobenzene; ketones such as acetone and 2-butanone; halogenated aliphatic hydrocarbons such as methylene chloride, chloroform and ethylene chloride; and cyclic or straight-chain ethers such as tetrahydrofaran and ethyl ether.

The thickness of charge transporting layer 20B is preferably 1 μm or more and 100 μm or less, more preferably 3 μm or more and 20 μm or less. When the thickness of charge transporting layer 20B is 1 μm or more and 100 μm or less, a high withstand voltage and reliability may be ensured. Additionally, the impedance matching with functional devices may be easy, thereby facilitating the designing.

Liquid crystal layer 17 is provided on the display side of photoconductive layer 20, via a laminate layer 18 and an absorption layer 19 which will be described later.

Liquid crystal layer 17 used in the exemplary embodiment is a liquid crystal layer having a function of modulating a reflection/transmission state of incident light according to an electric field by means of a change in a state of light interference of a cholesteric (chiral nematic) liquid crystal, and an ability of maintaining the selected state without application of an electric field. This liquid crystal layer may have a structure which is not deformed by an external force such as bending or pressure.

Liquid crystal layer 17 in the exemplary embodiments is formed from a self-holding liquid crystal composite composed of a cholesteric liquid crystal and a transparent resin. Namely, liquid crystal layer 17 in the exemplary embodiment does not need to include a spacer or the like, since it has a self-holding property as a composite. In the exemplary embodiment, liquid crystal layer 17 is formed from a polymeric matrix (transparent resin) 11 in which a cholesteric liquid crystal 17B is dispersed. In the exemplary embodiment, liquid crystal layer 17 is described as a liquid crystal layer of self-holding liquid crystal composite. However, liquid crystal layer 17 may also be formed only from a liquid crystal.

Cholesteric liquid crystal 17B has a function of modulating a reflection/transmission state of light of a specific color in the incident light. The molecule of the liquid crystal is oriented in a helically twisted manner, and only a specific light component of the light incident from the direction of helical axis is interference-reflected depending on the helical pitch. The orientation of the liquid crystal molecules varies according to an electric field, thereby changing the reflection state thereof. Since cholesteric liquid crystal 17B has a high reflectance with respect to the applied voltage, excellent display performances, and also a memory property, it may be used in display medium 12 of the exemplary embodiment. When liquid crystal layer 17 is formed from a self-holding liquid crystal composite, the liquid crystal may have a uniform drop size and disposed densely in a single layer.

Specific examples of the liquid crystal that may be used as cholesteric liquid crystal 17B include steroid-type cholesterol derivatives, nematic liquid crystals or smectic liquid crystals (e.g. Schiff base type liquid crystal, azo-based liquid crystal, azoxy-based liquid crystal, benzoate-based liquid crystal, biphenyl-based liquid crystal, terphenyl-based liquid crystal, cyclohexyl carboxylate-based liquid crystal, phenylcyclohexane-based liquid crystal, biphenyl cyclohexane-based liquid crystal, pyrimidine-based liquid crystal, dioxan-based liquid crystal, cyclohexyl cyclohexane ester-based liquid crystal, cyclohexyl ethane-based liquid crystal, cyclohexane-based liquid crystal, tolan-based liquid crystal, alkenyl-based liquid crystal, stilbene-based liquid crystal, condensed polycyclic-based liquid crystal), or a liquid crystal as mentioned above to which a chiral agent (e.g. steroid cholesterol derivatives, Schiff base-based chiral agent, azo-based chiral agent, ester-based chiral agent, biphenyl-based chiral agent) is added.

Liquid crystal layer 17 formed from a self-holding liquid crystal composite composed of cholesteric liquid crystal 17B and polymeric matrix 17A may have a polymer network liquid crystal (PNLC) structure in which a web formed from a resin is contained within a continuous phase of cholesteric liquid crystal, or a polymer dispersed liquid crystal (PDLC) structure in which a cholesteric liquid crystal is dispersed in droplets in a polymer skeleton (including one that is microencapsulated). By employing the PNLC structure or PDLC structure in the self-holding liquid crystal composite, an anchoring effect may be created at an interface of the cholesteric liquid crystal and the polymer, thereby enabling maintenance of a planar state or focal conic state when no electric field is applied, in a more stable manner The PNLC structure or PDLC structure may be formed by a known method of inducing phase separation of a polymer and a liquid crystal.

Examples of such a method include: a polymerization induced phase separation (PIPS) method in which a polymer precursor that is polymerized by heat, light, electron beams or the like, such as an acrylic, thiol or epoxy polymer precursor, is mixed with a liquid crystal, and the mixture in a uniform state is phase-separated by polymerization; an emulsion method in which a polymer that dissolves a liquid crystal at a low solubility, such as polyvinyl alcohol, is mixed together with a liquid crystal and the mixture is agitated to disperse the liquid crystal in the polymer in the form of droplets; a thermally induced phase separation (TIPS) method in which a thermoplastic polymer and a liquid crystal are mixed together and the mixture is heated to have a uniform state, which is then cooled to induce phase separation; and a solvent induced phase separation (SIPS) method in which a polymer and a liquid crystal are dissolved in a solvent such as chloroform, and the solvent is evaporated to induce phase separation of the polymer and the liquid crystal. However, the method is not particularly limited thereto.

Polymeric matrix 17A has a function of holding cholesteric liquid crystal 17B and suppress the flowage of liquid crystal (changes in an image) caused by the deformation of display medium 12. Polymer materials including a liquid as a solvent that does not dissolve in a liquid crystal material or phase-dissolve with the liquid crystal may be used for polymeric matrix 17A. Polymeric matrix 17A may be formed from a material having a strength which withstands an external force, and a high degree of transmission with respect to at least incident light and the exposure light.

Examples of the material to be used for polymeric matrix 17A include water-soluble polymer materials (e.g. gelatin, polyvinyl alcohol, cellulose derivatives, polyacrylic acid polymer, ethyleneimine, polyethylene oxide, polyacrylamide, polystyrene sulfonate salt, polyamidine, and isoprene sulfonic acid polymer) and materials that can form an aqueous emulsion (e.g. fluororesin, silicone resin, acrylic resin, urethane resin, epoxy resin).

Cholesteric liquid crystal 17B exhibits the following three states:

a planar state in which the helical axis is oriented in a direction perpendicular to the cell surface and causes the above-described selective reflection phenomenon with respect to incident light, as shown in FIG. 4A;

a focal conic state in which the helical axis is oriented substantially parallel to the cell surface and incident light is transmitted with a slight degree of forward scattering, as shown in FIG. 4B; and a homeotropic state in which the helical structure is unraveled and the liquid crystal director is in a direction of electric field, and incident light is almost completely transmitted, as shown in FIG. 4C.

Among the above three states, the planar state and the focal conic state may exist in a bistable manner without the application of an electric field. Therefore, the state of orientation of the cholesteric liquid crystal is not determined only by the voltage (i.e., partial voltage) applied to the liquid crystal layer. Accordingly, the liquid crystal has such a characteristic that when the planar state is the initial state, it changes in the order of from the planar state to the focal conic state, and to the homeotropic state as the partial voltage increases, and when the focal conic state is the initial state, it changes in the order of from the focal conic state to the homeotropic state, as the partial voltage increases (see FIG. 5).

Figure 5:
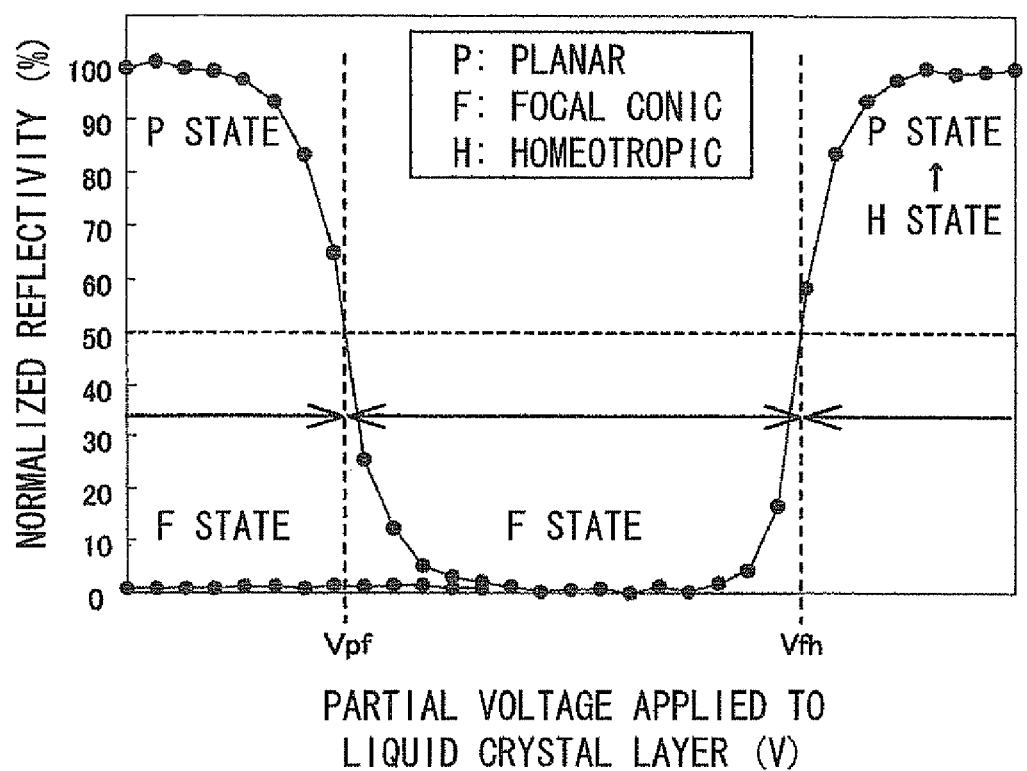
FIG. 5 is a graph describing the electro-optic response of a cholesteric liquid crystal layer.

On the other hand, when the partial voltage that has been applied to liquid crystal layer 17 is immediately decreased to zero, the planar state and the focal conic state maintain their states as they are, whereas the homeotropic state changes to the planar state (see FIG. 5).

Consequently, when the partial voltage that has been applied to liquid crystal layer 17 is immediately decreased to zero by stopping the application of voltage that has been applied to liquid crystal layer 17, liquid crystal layer 17 exhibits a switching behavior as shown in FIG. 5. Namely, after stopping the application of voltage, the liquid crystal turns to a selective reflection state by changing from the homeotropic state to the planar state, when the partial voltage that has been applied to liquid crystal layer 17 is Vfh (upper threshold voltage) or more; turns to a transmitting state resulting from the focal conic state, when the partial voltage is between Vpf (lower threshold voltage) and Vfh; or maintains its state prior to the voltage application, i.e., the selective reflection state resulting from the planar state or the transmitting state resulting from the focal conic state, when the partial voltage is Vpf or less.

In FIG. 5, the vertical axis indicates a normalized reflectivity that is normalized on the basis that the maximum reflectivity is 100 and the minimum reflectivity is 0. Since a transition region exists between each of the planar state, the focal conic state and the homeotropic state, the selective reflection state is defined as a state when the normalized reflectivity is 50 or more, and the transmitting state is defined as a state when the normalized reflectivity is less than 50. Further, the voltage at a threshold at which the state changes between planar and focal conic is defined as Vpf (upper threshold voltage), and the voltage at a threshold at which the state changes between focal conic and homeotropic is defined as Vfh (lower threshold voltage).

Between liquid crystal layer 17 and photoconductive layer 20 may be layered a laminate layer 18 and an optical absorption layer 19, in this order from the charge generating layer 20A side of photoconductive layer 20.

Laminate layer 18 may be provided for the purpose of absorbing the surface irregularity of the functional layers formed on the inner side of upper and lower substrates, and bonding these layers to each other. Laminate layer 18 may be formed from a polymeric material having a low glass transition point, and is preferably formed from a material which can bond the functional layers (in the exemplary embodiment, photoconductive layer 20 and liquid crystal layer 17) by heat or pressure. In the exemplary embodiment, laminate layer 18 is preferably an insulating layer from the viewpoint of generation of residual potential. In the exemplary embodiment, "insulating" or "insulation" refers to a state that the sheet resistance is $10^{10}$ Ω/square or more.

Examples of a suitable material for laminate layer 18 include polymeric materials having an adhesion property (e.g. urethane resins, epoxy resins, acrylic resins, and silicone resins).

Optical absorption layer (light-shielding layer) 19 may be provided for the purpose of performing optical separation of the exposure light and incident light in order to prevent malfunctions due to mutual interference, and performing optical separation of external light that is incident from the non-display surface side of display medium 12 and a displayed image in order to prevent deterioration of the image during displaying. In view of these purposes, optical absorption layer 19 may have a function of absorbing at least light in a wavelength region absorbed by charge generating layer 20A and light in a wavelength region reflected by liquid crystal layer 17.

Optical absorption layer 19 may be formed by a dry method of forming a film directly from an inorganic pigment (e.g. cadmium-based, chromium-based, cobalt-based, manganese-based, carbon-based) or an organic dye or an organic pigment (e.g. azo-based, anthraquinone-based, indigo-based, triphenylmethane-based, nitro-based, phthalocyanine-based, perylene-based, pyrrolo pyrrole-based, quinacridone-based, polycyclic quinone-based, squalirium-based, azulenium-based, cyanine-based, pyrylium-based, and antlirone-based), or a wet coating method of forming a film by applying and drying a coating composition prepared by dispersing or dissolving the above pigment or dye in a suitable solvent together with a polymer binder (e.g. a polyvinyl alcohol resin and a polyacrylic resin). The thickness of optical absorption layer 19 may be 1 μm or more and 10 μm or less.

In display medium 12 of the exemplary embodiment, optical absorption layer 19 is described as being formed on charge generating layer 20A via laminate layer 18. However, optical absorption layer 19 may be directly formed on charge generating layer 20A. In this case, optical absorption layer 19 may be an insulating layer from the viewpoint of easy generation of a residual potential. Since some materials and/or formation methods of the laminate layer may damage the photoconductive layer, an insulating isolation layer may be provided between laminate layer 18 and charge generating layer 20A.

In display medium 12 having the aforementioned structure, when a voltage is applied between electrodes 15 and 22, a partial voltage is applied to each of the layers formed between electrodes 15 and 22, respectively. When photoconductive layer 20 is irradiated with the exposure light in such conditions, the distribution of resistance of photoconductive layer 20 is changed according to the exposure light. Therefore, the partial voltage applied to liquid crystal layer 17 is increased according to the exposure light. The change in the distribution of the voltage applied to liquid crystal layer 17 causes a change in the orientation of liquid crystal, thereby displaying or recording information on liquid crystal layer 17 according to the exposure light.

Figure 2:
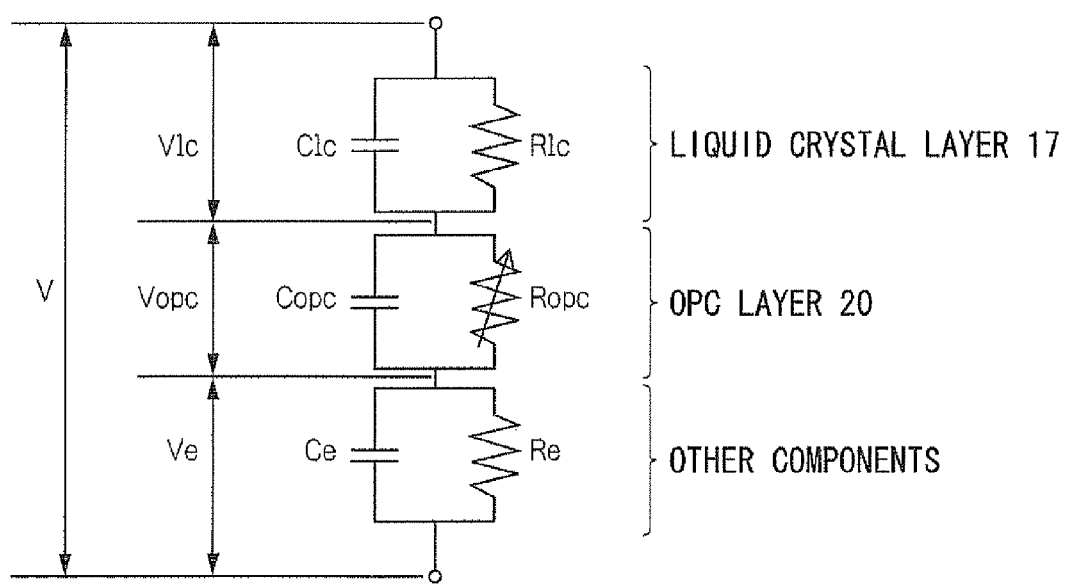
FIG. 2 is a diagram showing an equivalent circuit of the display medium with the structure shown in FIG. 1.

FIG. 2 is a circuit diagram showing an equivalent circuit of the display medium having a structure shown in FIG. 1. In FIG. 2, Clc and Copc are electrostatic capacitances of liquid crystal layer 17 and photoconductive layer 20, respectively. Rlc and Rope are values of resistance of liquid crystal layer 17 and photoconductive layer 20, respectively. Ce and Re are an equivalent electrostatic capacitance and an equivalent resistance value of other components than liquid crystal layer 17 and photoconductive layer 20.

When a voltage V is applied between electrodes 15 and 22 of display medium 12, partial voltages Vlc, Vopc and Ve, the values of which are determined by the impedance ratio among the components, are applied to each component. When irradiated with the exposure light, the resistance of photoconductive layer 20 Ropc changes in response to the intensity of the exposure light. Thus, the partial voltage applied to the liquid crystal layer 17 is controlled depending on whether the exposure light is applied or not applied. Specifically, the resistance of photoconductive layer 20 Ropc is decreased at a portion that is exposed to the exposure light while a voltage is applied between electrodes 15 and 22, and the partial voltage applied to liquid crystal layer 17 is increased as compared to a non-exposed portion.

Figure 3:
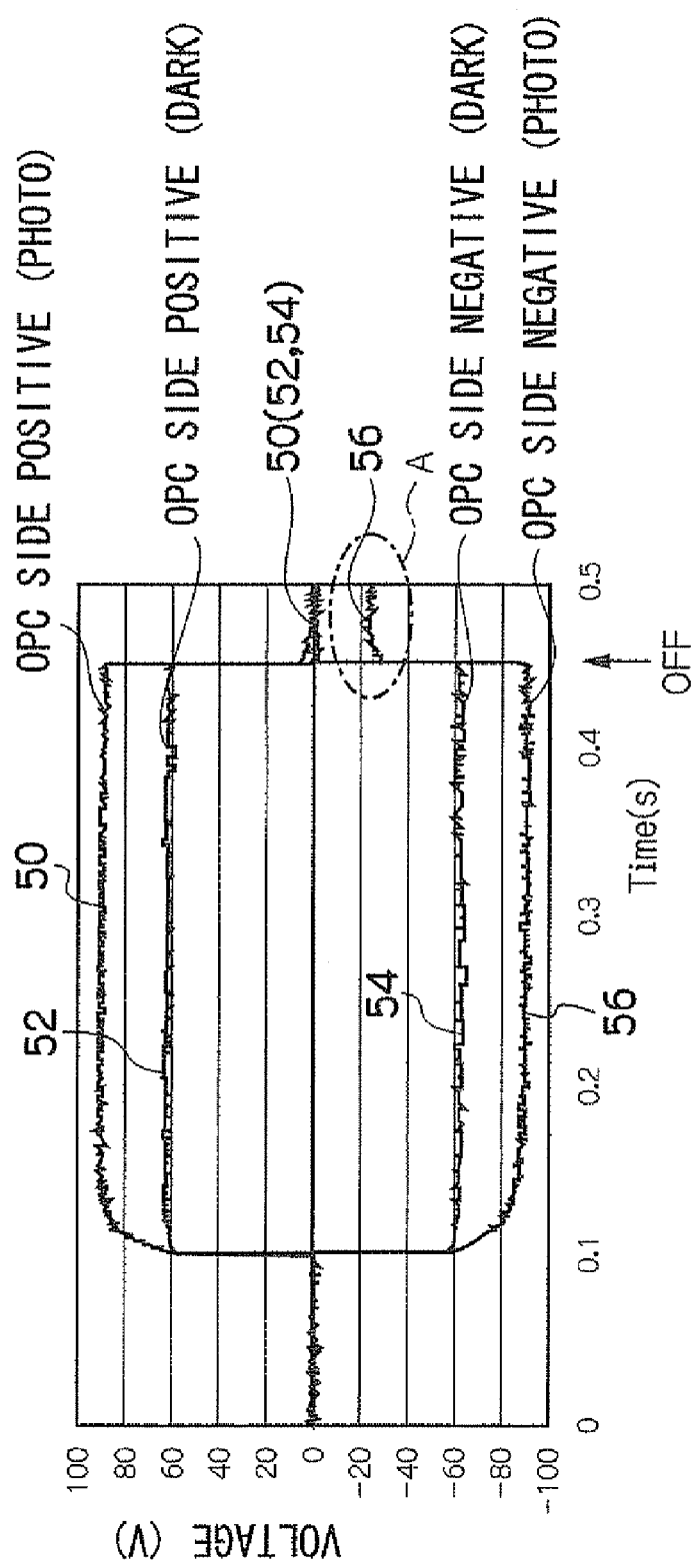
FIG. 3 is a diagram showing voltage characteristics of a cholesteric liquid crystal with respect to the applied voltage.

In display medium 12 having the structure shown in FIG. 1, when the application of a voltage that has been applied for a predetermined time to electrode 22 as the cathode and electrode 15 as the anode (i.e., the photoconductive layer side is positively polarized) is stopped, the partial voltage applied to liquid crystal layer 17 (i.e., the partial voltage applied to liquid crystal layer 17 when not exposed to the exposure light) is immediately decreased to zero after the application of a partial voltage according to the voltage applied between the electrodes to liquid crystal layer 17, as shown in the diagrammatic view 52 of FIG. 3. Further, when liquid crystal layer 17 is exposed to the exposure light while applying the voltage, the partial voltage applied to liquid crystal layer 17 becomes higher than the partial voltage at the time when not exposed to the exposure light (diagrammatic view 52) as shown in diagrammatic view 50 of FIG. 3, and immediately decreases to zero when the application of voltage is stopped.

In display medium 12 having the structure shown in FIG. 1, when the application of a voltage that has been applied for a predetermined time to electrode 22 as the anode and electrode 15 as the cathode (i.e., the photoconductive layer side is negatively polarized) is stopped, the behavior of liquid crystal layer 17 when it is not exposed to the exposure light is such that the partial voltage is immediately decreased to zero as the application of the voltage is stopped, as shown in diagrammatic view 54, similarly to the above case that the voltage is applied so that the photoconductive layer side is positively polarized.

Accordingly, when the partial voltage that has been applied to liquid crystal layer 17 is decreased to zero after stopping the application of the voltage, as shown in known techniques, if the partial voltage that is more than the upper threshold voltage Vfh is applied to liquid crystal layer 17, the state of cholesteric liquid crystal 17B changes from homeotropic to planar after stopping the application of the voltage.

However, the inventors have found that when the voltage that has been applied between electrode 22 as the anode and electrode 15 as the cathode for a predetermined time, together with the irradiation with the exposure light, is stopped, the partial voltage applied to liquid crystal layer 17 does not decrease to zero even if the application of the voltage is stopped, as shown in diagrammatic view 56, thereby generating a residual potential (see the inside of dotted line A of diagrammatic view 56 in FIG. 3).

Although the details of the reasons why the residual potential is generated are not clear, it is assumed as follows.

When a voltage is applied between electrodes 15 and 22 such that electrode 22 is the anode and electrode 15 is the cathode, and photoconductive layer 20 disposed between electrodes 15 and 22 is irradiated with the exposure light, electrons of the charges generated at the side of charge generating layer 20A move toward the side of electrode 15 as the cathode and remain at an interface of photoconductive layer 20 and laminate layer 18 (insulating layer). On the other hand, positive holes of the charges generated in charge generating layer 20A are transported through charge transporting layer 20B to the side of electrode 22 as the anode, and flow out to the side of charge generating layer 20C and the electrode 22 which are positioned downstream of the direction in which the charges are transported.

The reason why the residual potential is generated even after the application of voltage has been stopped is considered to be that the positive holes that have flowed out from charge transporting layer 20B to the side of charge generating layer 20C and electrode 22 are prevented from flowing back to charge transporting layer 20B even after the application of voltage has been stopped.

Therefore, in display medium 12 shown in FIG. 1, it is considered that charge generating layer 20C and electrode 22 function as a blocking layer 21 which prevents charges (positive holes) from flowing back to charge transporting layer 20B to be re-injected therein, after the application of the voltage has been stopped.

As described above, in display medium 12 of the exemplary embodiment, it has been found that a residual potential is generated in display medium 12 when charges are generated in charge generating layer 20A, and a voltage having a polarity by which the generated charges (holes) are moved toward the side of blocking layer 21 is applied between electrodes 15 and 22.

Moreover, it has been found that a residual potential is not generated in display medium 12 when charges are generated in charge generating layer 20C, and a voltage having a polarity by which the generated charges (holes) are moved toward the side opposite to blocking layer 21 is applied between electrodes 15 and 22.

Optical writing display apparatus 10 of the exemplary embodiment, as described above, is applicable to an optical writing display medium having a structure in which a residual potential is not generated when a voltage having a predetermined polarity is applied between the electrodes, but not generated when a voltage having a polarity opposite to the above is applied between the electrodes.

Specifically, the inventors have found that in display medium 12 of the exemplary embodiment, a residual potential generated in the following first initialization process disappears by performing, prior to an image writing process including applying a voltage having a polarity that does not generate a residual potential between electrodes 15 and 22 and conducting exposure, the first initialization process including applying a voltage having a polarity opposite to the voltage used in the image writing process and irradiating with the exposure light so as to align the orientation of liquid crystal to suppress the polarization occurring in liquid crystal layer 17 due to a continuous application of the voltage having the same polarity; and a second initialization process including stopping the application of the voltage to the electrodes and irradiating with the exposure light during stopping the application of the voltage.

Namely, the inventors have found that the residual potential, which has been generated by applying a voltage having a polarity by which the residual potential is generated to electrodes 15 and 22 and irradiating with the exposure light, disappears by stopping the application of the voltage to electrodes 15 and 22 but continuing the irradiation with the exposure light while stopping the voltage application Hereinafter, details of optical writing display apparatus 10 of the exemplary embodiment will be described. In optical writing display apparatus 10 of the exemplary embodiment, display medium 12 is described as having a structure shown in FIG. 1.

Writing unit 14 is a unit which writes an image to display medium 12, and includes an exposure unit 30 which exposes display medium 12 to exposure light by scanning display medium 12; a one-shot exposure unit 32 which exposes the entire surface of display medium 12 to exposure light at one time; a voltage application unit 26 which applies a voltage between electrodes 15 and 22 of display medium 12; and a control section 28 which is electrically connected to exposure unit 30, one-shot exposure unit 32, and voltage applying unit 26 and controls these components.

Exposure unit 30 includes a light source 30A which irradiates display medium 12 with the exposure light, i.e., light in a wavelength region which is absorbed by photoconductive layer 20 of display medium 12, and a drive unit 30B which drives light source 30A to scan the entire region of display medium 12.

When light source 30A is not driven to scan, the region of liquid crystal layer 17 to be irradiated with the exposure light by light source 30A may not be bigger than the region corresponding to each pixel of an image to be displayed on liquid crystal layer 17. By controlling the state of exposing or non-exposing of light source 30A and scan-driving by drive unit 30B, the state of exposing or non-exposing with the exposure light is adjusted according to each pixel of the image displayed on liquid crystal layer 17.

The type of light source 30A is not particularly limited as long as it irradiates photoconductive layer 20 of display medium 12 with exposure light having desired properties (such as spectrum, intensity and spatial frequency) based on the signal input from control section 28. The exposure light emitted from light source 30A is preferably light having as much energy as possible in a wavelength region absorbed by photoconductive layer 20.

Specific examples of light source 30A include those having a cold-cathode tube, a xenon lamp, a halogen lamp, a light emitting diode (LED), EL, or laser, which is arranged in a one-dimensional array. Specific examples of drive unit 30B include a driving apparatus which drives a polygon mirror or light source 30A to scan in a one-dimensional or two-dimensional manner.

In addition, various kinds of optical devices (e.g. microlens array, cell hook lens array, prism array, viewing angle adjustment sheet) may be used in combination.

The one-shot exposure unit 32 includes a light source (not shown) and capable of irradiating the entire region of photoconductive layer 20 of display medium 12 at one time. The structure of one-shot exposure unit 32 may be, for example, a structure in which the aforementioned light sources that may be used in light source 30A are arranged in an array form so as to cover the entire region of photoconductive layer 20.

The type of voltage application section 26 is not particularly limited as long as it applies a voltage between the electrodes 15 and 22, at a predetermined polarity and value for a predetermined time period in response to a signal input from control section 28. Specific examples of voltage application section 26 include a bipolar high-voltage amplifier.

Specifically, the voltage is applied by voltage application section 26 via contact terminals 25 to electrodes 15 and 22. Here, contact terminals 25 are a member which contacts voltage application section 26 and each of electrodes 15 and 22 of display medium 12 so as to electrically connect these components. Therefore, the material for contact terminals 25 is selected from those having a high conductivity and a low contact resistance with respect to electrodes 15 and 22 and voltage application section 26. Contact terminals 25 may be detachable from at least either electrodes 15 and 22 or voltage application section 26, so that display medium 12 can be detached from writing unit 14.

Examples of the material for contact terminals 25 include a terminal formed from a metal (e.g. gold, silver, copper, aluminum and iron), carbon, a composite formed by dispersing the above material in a polymer, or an electroconductive polymer (e.g. thiophene-based polymer and polyaniline-based polymer) having a shape of a clip or a connector capable of holding the electrode.

Control section 28 includes a central processing unit (CPU), a read only memory (ROM), and a random access memory (RAM), which is not shown in the drawing. Control section 28 controls each component of writing unit 14 according to the program stored in the ROM, and controls voltage application section 26, exposure unit 30 and one-shot exposure unit 32, so as to display an image on display medium 12 according to image data obtained from an external apparatus through a wire circuit or a wireless circuit.

Control section 28 functionally includes a first initialization processing unit 28A, a second initialization processing unit 28B, and a writing processing unit 28C.

First initialization processing unit 28A performs a first initialization process in which the orientation of the whole liquid crystal layer 17 of display medium 12 is changed to a homeotropic state by applying a voltage having a polarity opposite to that of a voltage used for writing an image, and irradiating liquid crystal layer 17 with exposure light. Second initialization processing unit 28B performs a second initialization process in which residual charges that have been generated are removed by stopping the application of the voltage that has been applied in the first initialization process, but continuing the irradiation of liquid crystal layer 17 with the exposure light. Writing processing unit 28C performs an image writing process in which an image is written and established by applying a voltage having a polarity opposite to that of the voltage that has been applied in the first initialization process, and stopping the voltage application after irradiating a portion according to the image with exposure light.

Display medium 12 may be integrated with writing unit 14 or may be detachable from writing unit 14. When display medium 12 has a structure that is detachable from writing unit 14, for example, display medium 12 may be attached with a slot (not shown) so that electrodes 15 and 22 of display medium 12 can be applied with a voltage from voltage application section 26, and liquid crystal layer 17 of display medium 12 can be irradiated with exposure light by exposure unit 30 and one-shot exposure unit 32.

When display medium 12 is detachable from writing unit 14, it is possible to carry display medium 12 alone, which is advantageous for browsing, circulation or distribution of display medium 12. Moreover, it is possible to write a new image or erase the written image by attaching display medium 12 to the slot of writing unit 14 again.

Subsequently, the process of writing an image to display medium 12 in optical writing display apparatus 10 of the exemplary embodiment will be described.

Figure 6:
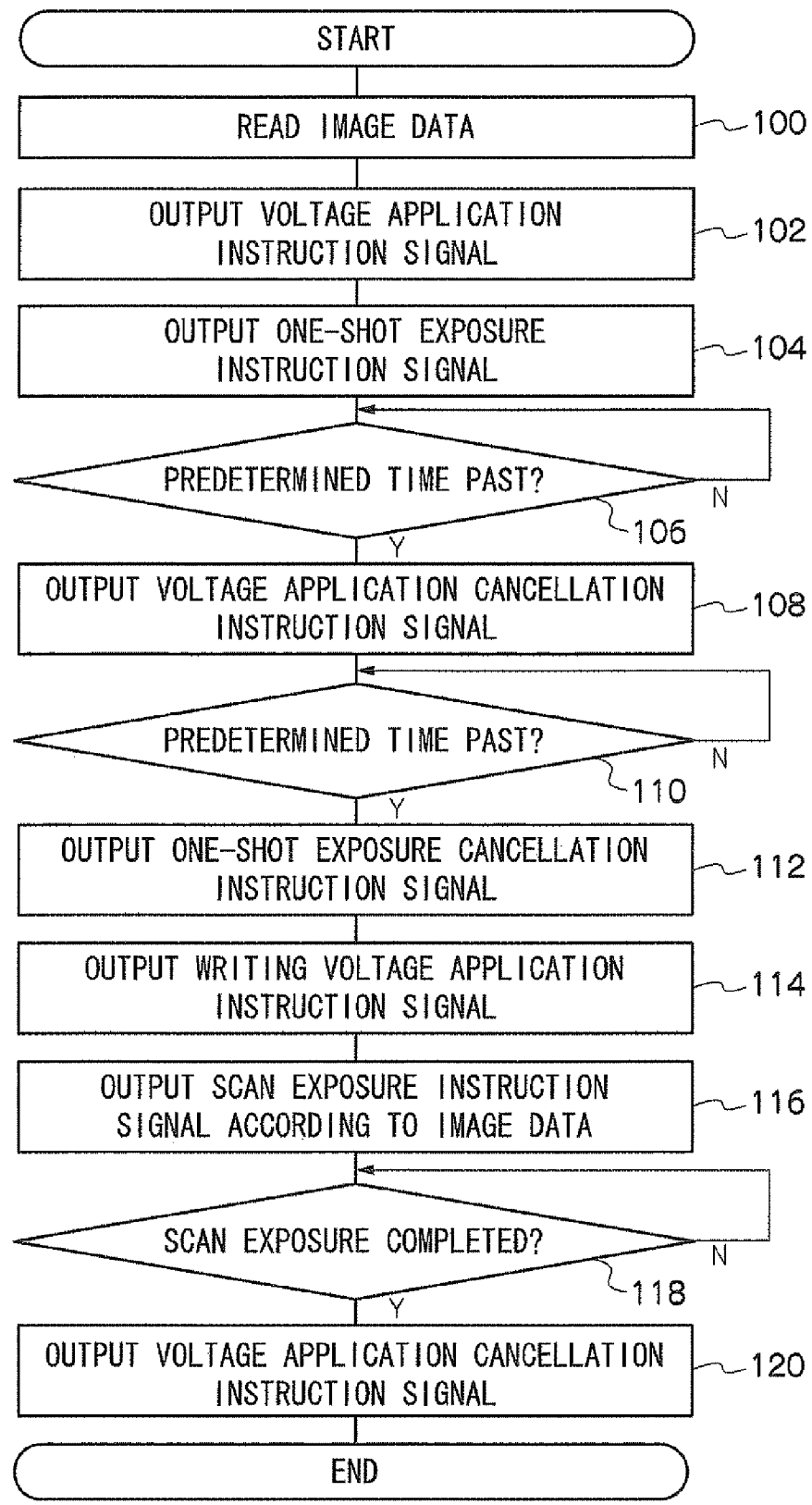
FIG. 6 is a flow chart showing the optical writing process performed by a control section of a writing unit of the optical writing display apparatus.

In control section 28, when display medium 12 is attached to writing unit 14 such that electrodes 15 and 22 can be applied with a voltage from voltage application section 26 and liquid crystal layer 17 can be irradiated with exposure light by exposure unit 30 and one-shot exposure unit 32, and a switch (not shown) is operated to input a signal indicating image writing instructions, a processing routine as shown in FIG. 6 is performed by reading an image area exposure writing program stored in the ROM (not shown).

In step 100, image data obtained from an external apparatus is read. The image data may be obtained from an external apparatus through a wired circuit or a wireless circuit, or may be obtained from a recording medium of various kinds.

In step 102, a voltage application instruction signal is output to voltage application section 26 to apply a voltage between electrodes 15 and 22. The voltage applies a partial voltage to liquid crystal layer 17 which is more than the upper threshold (Vth shown in FIG. 5) at which the state of cholesteric liquid crystal 17B changes from focal conic to homeotropic when exposed to the exposure light. The polarity of the voltage is opposite to that of a voltage applied in the image writing process, namely, the voltage is applied such that electrode 15 is the cathode and electrode 22 is the anode.

In the exemplary embodiment, the voltage in step 102 may also be applied such that electrode 15 is the anode and electrode 22 is the cathode depending on the structure of display medium 12, as long as the polarity is opposite to that of the voltage applied in the image writing process, and is the polarity by which a residual potential is generated.

Voltage application section 26 that has received the voltage application instruction signal applies a voltage to electrode 15 as the cathode and electrode 22 as the anode, such that a partial voltage which is more than the upper threshold (Vth in FIG. 5) at which the state of cholesteric liquid crystal 17B changes from focal conic to homeotropic is applied to liquid crystal layer 17, in response to the voltage application instruction signal.

In step 104, a one-shot exposure instruction signal is output to one-shot exposure unit 32 that instructs one-shot exposure unit 32 to conduct one-shot exposure of the entire surface of liquid crystal layer 17 with the exposure light. One-shot exposure unit 32 that has received the one-shot exposure instruction signal starts irradiation of the entire region of photoconductive layer 20 with the exposure light.

In step 106, a negative judgment is repeated until the lapse of a predetermined time period, and the processing routine proceeds to step 108 upon receipt of an affirmative judgment. The above time period may be determined to be at least a time period during which the state of cholesteric liquid crystal 17B in the entire region changes to homeotropic since the initiation of exposure at step 104, the measurement of which can be conducted in advance.

Through the aforementioned steps 102 to 106, a voltage having a polarity opposite to that of the voltage used in image writing is applied to electrodes 15 and 22, the entire region of display medium 12 is exposed to exposure light, and a partial voltage is applied to liquid crystal layer 17 that is more than the upper threshold (Vth) at which the state of cholesteric liquid crystal 17B changes from focal conic to homeotropic. Consequently, as shown in FIG. 5, cholesteric liquid crystal 17B of the entire region of liquid crystal layer 17 changes to a homeotropic state.

The processes conducted at steps 102 to 106 correspond to the first initialization process that is carried out by first initialization processing unit 28A of control section 28.

In step 108, a voltage application cancellation instruction signal is output to voltage application section 26, The signal instructs voltage application section 26 to stop the application of the voltage that has been applied between electrodes 15 and 22 in the first initialization process as mentioned above.

Voltage application section 26 that has received the voltage application cancellation instruction signal stops the application of the voltage between electrodes 15 and 22.

In step 110, a negative judgment is repeated until the lapse of a predetermined time period from the output of the voltage application cancellation instruction signal in step 108, and the processing routine proceeds to step 112 upon receipt of an affirmative judgment.

The processes carried out in steps 108 and 110 correspond to the second initialization process that is conducted by second initialization processing unit 28B of control section 28.

By conducting the second initialization process (processes at steps 108 and 110), the voltage application between electrodes 15 and 22 is stopped while continuing to irradiate the entire region of photoconductive layer 20 with the exposure light, and the same state is maintained for a predetermined time period. In other words, in the second initialization process, the voltage application between electrodes 15 and 22 is stopped for a predetermined time period, and display medium 12 is irradiated with the exposure light during the same time period.

When the entire region of photoconductive layer 20 is irradiated with the exposure light while the voltage application between electrodes 15 and 22 is stopped, electrons that have accumulated at the side of charge generating layer 20A and positive holes that have accumulated at the side of charge generating layer 20C are recombined to inactivate by positive holes and electrons that have been optically generated in charge generating layer 20C. Thus, it is considered that the residual potential that has been generated in the first initialization process (steps 102 to 106) disappears in the second initialization process (steps 108 and 110).

The predetermined time in step 110 may be determined by previously conducting a measurement of a time period during which a residual potential disappears by stopping the voltage application while continuing the exposure after the voltage application cancellation instruction signal has been output at step 108.

In the exemplary embodiment, the term "residual potential disappears" refers to a state that the residual potential that has been generated due to remaining charges becomes small enough not to adversely affect the driving of the liquid crystal layer. Although the specific value may depend on the material of the liquid crystal layer or the like, it is generally not more than 10 percent of an initial value of the residual potential.

In step 112, a one-shot exposure instruction signal is output to one-shot exposure unit 32. The signal instructs one-shot exposure unit 32 to stop exposing the entire surface of liquid crystal layer 17 to the exposure light. One-shot exposure unit 32 which has received the one-shot exposure instruction signal stops the irradiation with the exposure light.

In step 114, a writing voltage application instruction signal is output to voltage application section 26. The signal instructs voltage application section 26 to apply a voltage between electrode 15 as the anode and electrode 22 as the cathode. The voltage has a polarity opposite to the polarity of the voltage applied in the first initialization process, and applies a partial voltage to liquid crystal layer 17 that is not more than the upper threshold (Vth in FIG. 5) at which the state of cholesteric liquid crystal 17B changes from focal conic to homeotropic when liquid crystal layer 17 is not exposed, but more than the upper threshold when liquid crystal layer 17 is exposed.

In the exemplary embodiment, the voltage to be applied in step 114 may also be applied such that electrode 15 is the cathode and electrode 22 is the anode depending on the structure of display medium 12, as long as the polarity of the voltage is opposite to that of the voltage applied in the first initialization process, and is the polarity at which a residual potential is not generated.

Voltage application section 26 that has received the writing voltage application instruction signal applies a voltage to electrode 15 as the anode and electrode 22 as the cathode, such that the partial voltage applied to liquid crystal layer 17 is not more than the upper threshold (Vth in FIG. 5) at which the state of cholesteric liquid crystal 17B changes from focal conic to homeotropic when liquid crystal layer 17 is not exposed, but more than the upper threshold when liquid crystal layer 17 is exposed.

In step 116, a scan exposure instruction signal is output to exposure unit 30. The signal instructs exposure unit 30 to expose a portion of liquid crystal layer 17 to the exposure light by scanning, based on the image data that have been read in step 100. The portion to be exposed corresponds to a portion on which no image to be displayed of liquid crystal layer 17 (so-called non-image portion).

The scan exposure instruction signal may include, for example, positional information that indicates the positional coordinate of each pixel of an image to be displayed on liquid crystal layer 17 and information that instructs to perform exposure, so that a portion other than a portion that corresponds to each pixel of the image to be displayed on liquid crystal layer 17 is irradiated with the exposure light.

Exposure unit 30 that has received the scan exposure instruction signal moves light source 30A by drive unit 30B to a position according to the positional information included in the signal, and at which position the exposure light is radiated from light source 30A.

In the processes of steps 114 and 116, the non-image region is scan-exposed to the exposure light according to the image to be displayed on display medium 12, while a voltage having a polarity opposite to that of the voltage applied in the first initialization process is applied between electrodes 15 and 22. Thus, a partial voltage which is more than the upper threshold (Vth) at which the state of cholesteric liquid crystal 17B changes from focal conic to homeotropic is applied to liquid crystal layer 17 is applied to the scan-exposed portion of liquid crystal layer 17, and the state of cholesteric liquid crystal 17B at the scan-exposed portion of liquid crystal layer 17 changes from focal conic to homeotropic.

In step 118, a negative judgment is repeated until exposure unit 30 completes scan-exposing the entire region of liquid crystal layer 17. The processing routine proceeds to step 120 upon receipt of an affirmative judgment. The judgment in step 120 may be conducted, for example, in such a manner that an end signal is output to control section 28 when exposure unit 30 has completed scan-exposing the non-image portion of liquid crystal layer 17, and the affirmative judgment is conducted upon receipt of the end signal.

In step 120, a voltage application cancellation instruction signal is output to voltage application section 26. The signal instructs voltage application section 26 to stop the application of the voltage between electrodes 15 and 22, and the processing routine is completed.

By the process conducted in step 120, the state of exposed portion of liquid crystal layer 17 changes from homeotropic to planar, while the state of non-exposed portion of liquid crystal layer 17 changes to focal conic, thereby determining the image.

The processes conducted in steps 112 to 120 correspond to the image writing process which is performed by writing processing unit 28C of control section 28.

Figure 7:
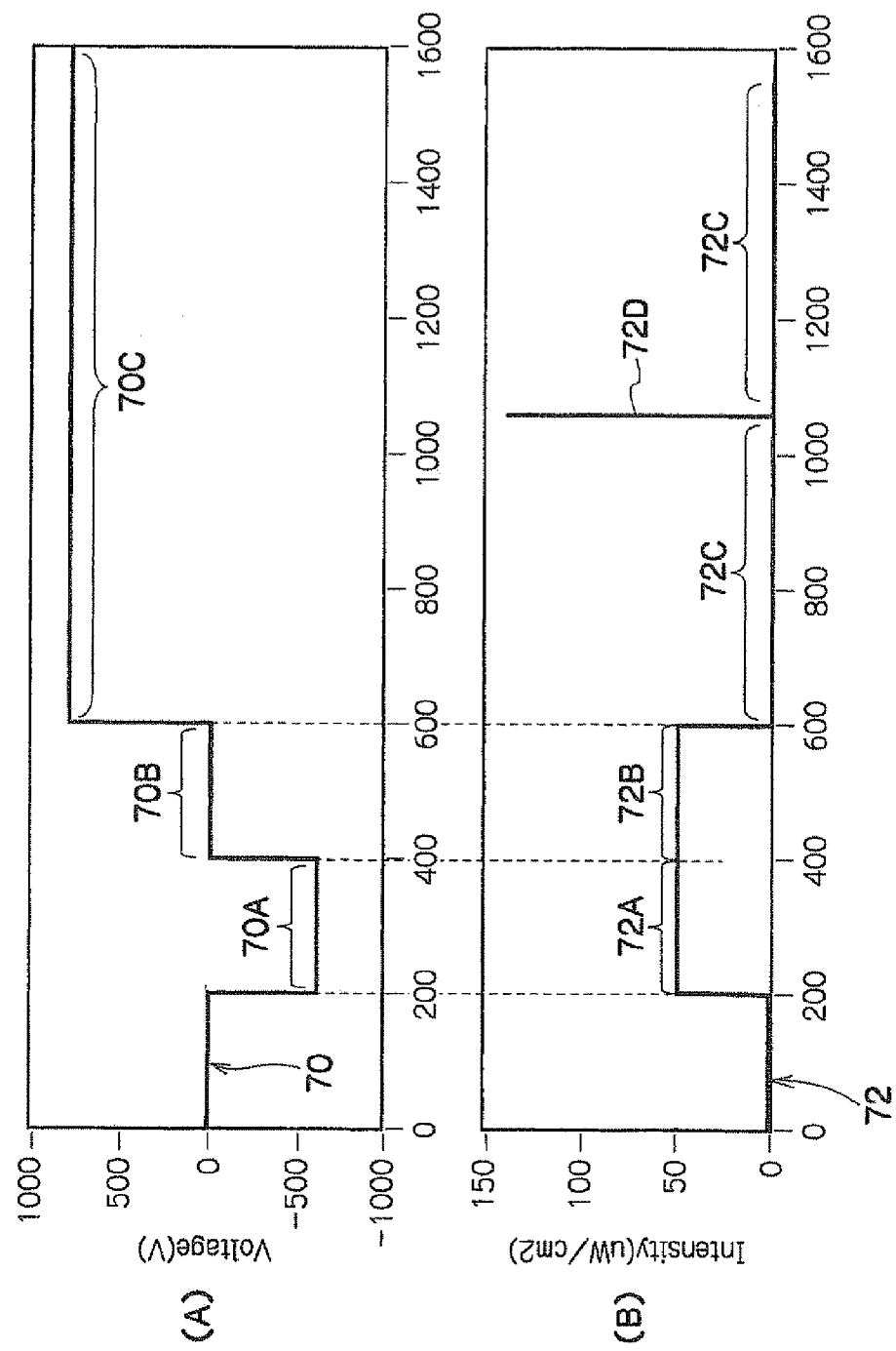
FIG. 7 is a diagrammatic view showing a voltage waveform (A) and exposure waveform (B) measured upon performance of a optical writing process by the control section of the writing unit of the optical writing display apparatus.

Through the aforementioned steps 100 to 120, by sequentially carrying out the first initialization process by first initialization processing unit 28A, the second initialization process by second initialization processing unit 28B, and the image writing process by writing processing unit 28C, a voltage in the form of voltage waveform 70 as shown in FIG. 7 is applied to display medium 12.

Specifically, a voltage having a polarity opposite to that of a voltage applied in the image writing process is applied for a predetermined time (diagrammatic view 70A); the application of the voltage is stopped for a predetermined time (diagrammatic view 70B); and then a voltage having a polarity opposite to the above (the voltage applied in the process of image writing) is applied for a predetermined time (diagrammatic view 70C).

Corresponding to the voltage application as shown above, exposure is conducted with the exposure light that changes in the form of exposure waveform 72 as shown in FIG. 7. That is, when the voltage having a polarity opposite to that applied in the image writing is applied for a predetermined time (diagrammatic view 70A), the exposure light is emitted (diagrammatic view 72A); when the application of the voltage is stopped for a predetermined time (diagrammatic view 70B), the exposure light is continuously emitted (diagrammatic view 72B); and when the voltage for image writing is applied for a predetermined time (diagrammatic view 70B), the portion corresponding to a non-image portion is scan-exposed (diagrammatic view 72D) from the non-exposed state (diagrammatic view 72C).

As shown above, since a voltage having a polarity opposite to that of a voltage that is applied in the image writing process is applied between electrodes 15 and 22 in the first initialization process, occurrence of polarization due to ionic migration in liquid crystal layer 17 caused by the application of only a voltage having the same polarity, which leads to deterioration of liquid crystal layer 17 over repetitive writing, may be suppressed.

As mentioned above, a residual potential may be generated by applying a voltage having a polarity opposite to that of a voltage that is applied in the image writing process between electrodes 15 and 22 in the first initialization process. However, this residual potential may be removed by conducting the second initialization process between the first initialization process and the writing process. Specifically, the residual potential may disappear by irradiating photoconductive layer 20 with the exposure light while stopping the voltage application between electrodes 15 and 22.

Therefore, the residual charge has disappeared in the image writing process that is conducted after the second initialization process. Accordingly, it is possible to suppress image degradation caused by a phenomenon that liquid crystal layer 17 does not change its state in a desired manner because a partial voltage applied to liquid crystal layer 17 when exposed to the exposure is less than the aforementioned upper threshold even when a voltage that could apply a partial voltage more than the upper threshold if no residual potential was generated is applied.

Consequently, according to optical writing display apparatus 10 of the exemplary embodiment, even when an image is displayed on display medium 12 for a number of times, reduction in light sensitivity or deterioration of the liquid crystal layer may be suppressed and, therefore, deterioration in image quality may be suppressed.

In display medium 12 of the exemplary embodiment, charge transporting layer 203B of photoconductive layer 20 is described as a charge transporting layer which transports positive holes. However, charge transporting layer 20B may be replaced with a charge transporting layer which transports electrons. In this case, the aforementioned steps 110 to 120 may be carried out in a similar manner, except that a voltage is applied to electrode 15 as the anode and electrode 22 as the cathode in step 102, and electrode 15 as the cathode and electrode 22 as the anode in step 114.

When charge transporting layer 20B functions as a charge transporting layer which transports electrons, the material for the charge transporting layer may be, for example, those obtained by dissolving or dispersing an electron transferring material in a binder resin. Known materials may be used as the electron transfer material, and specific examples thereof include electron-accepting substances such as a fluorenone compound, a diphenoquinone compound, or an imide compound; and a polymeric compound obtained from polymerizing the electron-accepting substance.

EXAMPLES

Hereinafter, the invention will be described in further details with reference to Examples. However, the invention is not limited thereto.

Example 1

(Production of Optical Writing Display Medium)

An ITO film (sheet resistance: 300 Ω/square) is formed on a polyethylene terephthalate (PET) substrate (thickness: 125 μm) as an electrode, and a lower charge generating layer is formed on the ITO film. Specifically, hydroxygallium phthalocyanine (showing intense diffraction peaks at Bragg angles ($2\theta \pm 0.2°$) of X-ray refractive spectrum at 7.0°, 7.5°, 10.5°, 11.7°, 12.7°, 17.3°, 18.1°, 24.5°, 26.2°, and 27.1°) is used as the charge generating material and an alcohol-soluble polyvinyl butyral resin (trade name: S-LEC BH-3, manufactured by Sekisui Chemical Co., Ltd.) is used as the binder resin. These materials are dispersed in butanol at a weight ratio of 1:1 using a disperser (trade name: Dyno-Mill) to prepare a dispersion of 2% by weight (composition A). The resulting composition is applied onto the substrate by a spin coating method, followed by drying to form the lower charge generating layer with an optical absorption of 80% at a wavelength of 780 nm.

Subsequently, a charge transporting layer is formed on the lower charge generating layer. Specifically, NN-bis(3,4-dimethylphenyl)bisphenyl-4-amine as the charge transport material and polycarbonate (trade name: Z300, manufactured by Mitsubishi Gas Chemical Company, Inc.) as the binder resin are mixed at a weight ratio of 1:1, and the resulting mixture is dissolved in monochlorobenzene to prepare a solution of 10% by weight (composition B). The charge transporting layer having a thickness of 10 μm is formed on the lower charge generating layer by applying the coating liquid with an applicator (Gap: 100 μm) and drying it.

Further, an upper charge generating layer with an optical absorption of 80% at a wavelength of 780 nm is formed by applying a coating liquid having the same composition as composition A, except that the solid concentration is 4% by weight, onto the charge transporting layer by a spin coating method, followed by drying it. A photoconductive layer is thus formed.

Thereafter, an isolation layer that isolates a laminate layer (which will be prepared in the following step) from the photoconductive layer is formed by applying a solution containing 3% by weight of polyvinyl alcohol by a spin coating method to form a polyvinyl alcohol film (thickness: about 1 μm) on the photoconductive layer. As a result, a PET substrate on which the ITO electrode, the photoconductive layer, and the isolation layer are laminated is prepared.

84 parts by weight of a nematic liquid crystal (trade name: E7, manufactured by Merck & Co., Inc.), 10.8 parts by weight of a chiral agent (trade name: R811, manufactured by Merck & Co., Inc.), and 2.7 parts by weight of a chiral agent (trade name: R1011, manufactured by Merck & Co., Inc.) are mixed to give 100 parts of a cholesteric liquid crystal having a selective reflection wavelength of 650 nm. This cholesteric liquid crystal, 10 parts by weight of polyvalent isocyanate (trade name; TAKENATE D-110N, manufactured by Takeda Pharmaceutical Company Limited), and 3 parts by weight of octadecanol (manufactured by Aldrich) as a precursor of a perpendicularly-orientated component are dissolved in 1000 parts by weight of ethyl acetate to prepare an oil phase composition. The oil phase composition is put in 10,000 parts by weight of an aqueous solution containing 1% by weight of polyvinyl alcohol, which is stirred and dispersed with a mixer to produce an emulsion having a volume average particle diameter of 7 μm.

100 parts by weight of an aqueous solution containing 10% by weight of polyallylamine (manufactured by Nittobo Incorporated) is added to the emulsion, and the resultant is heated at 70° C. for 2 hours to form microcapsules having a shell of polyurea. The obtained microcapsules are collected by centrifiging. Thereafter, a solution containing 10% by weight of polyvinyl alcohol is added to the microcapsules so that one third of the weight of the solid content of the microcapsules is polyvinyl alcohol, thereby preparing a composition C.

The obtained composition C is applied onto an ITO film formed on a PET film by a wire bar coating method to form a liquid crystal layer (thickness: 35 μm). Next, carbon black is dispersed in a polyvinyl alcohol solution (solid content: 10% by weight), and the dispersion is applied onto the surface of the liquid crystal layer to form a black optical absorption layer (thickness: 3 μm). As a result, a PET film on which the ITO electrode, the liquid crystal layer, and the optical absorption layer are formed is prepared.

—Preparation of Display Medium—

A two liquid-type polyurethane adhesive (trade name: A50/A315, manufactured by Takeda Pharmaceutical Company Limited) is applied onto the above-prepared isolation layer of the PET film on which the ITO electrode, the photoconductive layer and the isolation layer are formed, and then dried to form a laminate layer having a thickness of 2 μm. Onto the laminate layer, the PET substrate on which the ITO electrode, the liquid crystal layer and the optical absorption layer are formed is adhered so that the optical absorption layer contacts the laminate layer, followed by laminating at 90° C. to prepare a black-and-white display medium.

(Potential Characteristics of Display Medium)

The display medium obtained in the above process (synthetic capacity: 6 nF) and a capacitor of 60 nF are connected in series, which is then connected to an external circuit having a power supply and a voltmeter. Changes in a partial voltage applied to the capacitor that occurs when the polarity of a voltage to be applied are measured at the time when the application of a voltage of 660V to both ends of the display medium is stopped 0.35 second after the application; and at the time when the entire surface of the display medium is irradiated with 50 μW/cm$^2$ of LED light (wavelength: 780 nm) for 0.1 second from the initiation of voltage application to the stopping of voltage application, respectively.

The changes in the partial voltage applied to the above capacitor show a similar pattern to that of the changes in the partial voltage applied to the liquid crystal layer in the display medium. Therefore, the behavior of the partial voltage applied to the liquid crystal layer may be estimated from the changes in the partial voltage applied to the capacitor.

As a result of the above measurement, when the electrode closer to the photoconductive layer is used as the cathode and the electrode closer to the liquid crystal layer is used as the anode, and a voltage is applied and then stopped without the irradiation with LED light, measurement results as shown in diagrammatic view 52 of FIG. 3 are obtained and no residual potential is generated after the voltage application has been stopped.

When the electrode closer to the photoconductive layer is used as the cathode and the electrode closer to the liquid crystal layer is used as the anode, and a voltage is applied and then stopped with the irradiation with LED light, measurement results as shown in diagrammatic view 50 of FIG. 3 are obtained and no residual potential is generated after the voltage application has been stopped.

When the electrode closer to the photoconductive layer is used as the anode and the electrode closer to the liquid crystal layer is used as the cathode, and a voltage is applied and then stopped without the irradiation with LED light, measurement results as shown in diagrammatic view 54 of FIG. 3 are obtained and no residual potential is generated after the voltage application has been stopped.

When the electrode closer to the photoconductive layer is used as the anode and the electrode closer to the liquid crystal layer is used as the cathode, and a voltage is applied and then stopped with the irradiation with LED light, measurement results as shown in diagrammatic view 56 of FIG. 3 are obtained and a residual potential of about 25V is generated after the voltage application has been stopped.

From the above value and the ratio of the capacity of the capacitor (60 nF) to the capacity of the liquid crystal layer (about 10 nF), it is estimated that a residual potential of about 150 V has been generated in the liquid crystal layer.

(Writing Characteristics of Display Medium)

Writing characteristics of display medium 12 are evaluated in the following manner. First, display medium 12 and a capacitor of 30 nF are connected in series, which is then connected to the external circuit as shown above and the processing routine as shown in FIG. 6 is carried out.

The following are the details of the voltage which is applied between electrode 15 and 22 in response to the voltage application instruction signal which is output in step 102 (first initialization process); the voltage which is applied between electrodes 15 and 22 in response to the writing voltage application instruction signal which is output in step 114 (writing process); the exposure light which is emitted in response to the one-shot exposure instruction signal which is output in step 104 (first and second initialization processes); and the exposure light which is scan-exposed in response to the scan exposure instruction signal which is output in step 116 (writing process).

The voltage in response to the voltage application instruction signal which is output in step 102 (first initialization process) is applied to electrode 15 as the cathode and electrode 22 as the anode, at a voltage of 600 V for 200 ms.

The voltage in response to the writing voltage application instruction signal which is output in step 114 (writing process) is applied to electrode 15 as the anode and electrode 22 as the cathode, at a voltage of 450 V for 1 s.

The exposure light in response to the one-shot exposure instruction signal which is output in step 104 (first and second initialization processes) is emitted at a power of 50 μW and a wavelength of 780 nm for 200 ms, in each of the first and second initialization processes.

The exposure light in response to the scan exposure instruction signal which is output in step 116 (writing process) is emitted at a power of 150 μW and a wavelength of 780 nm for 10 ms. This process is conducted 500 ms after the initiation of application of the writing voltage application in a one-shot manner to the entire surface of the display medium, in order to simulatively reproduce the scanning exposure process.

Figure 8:
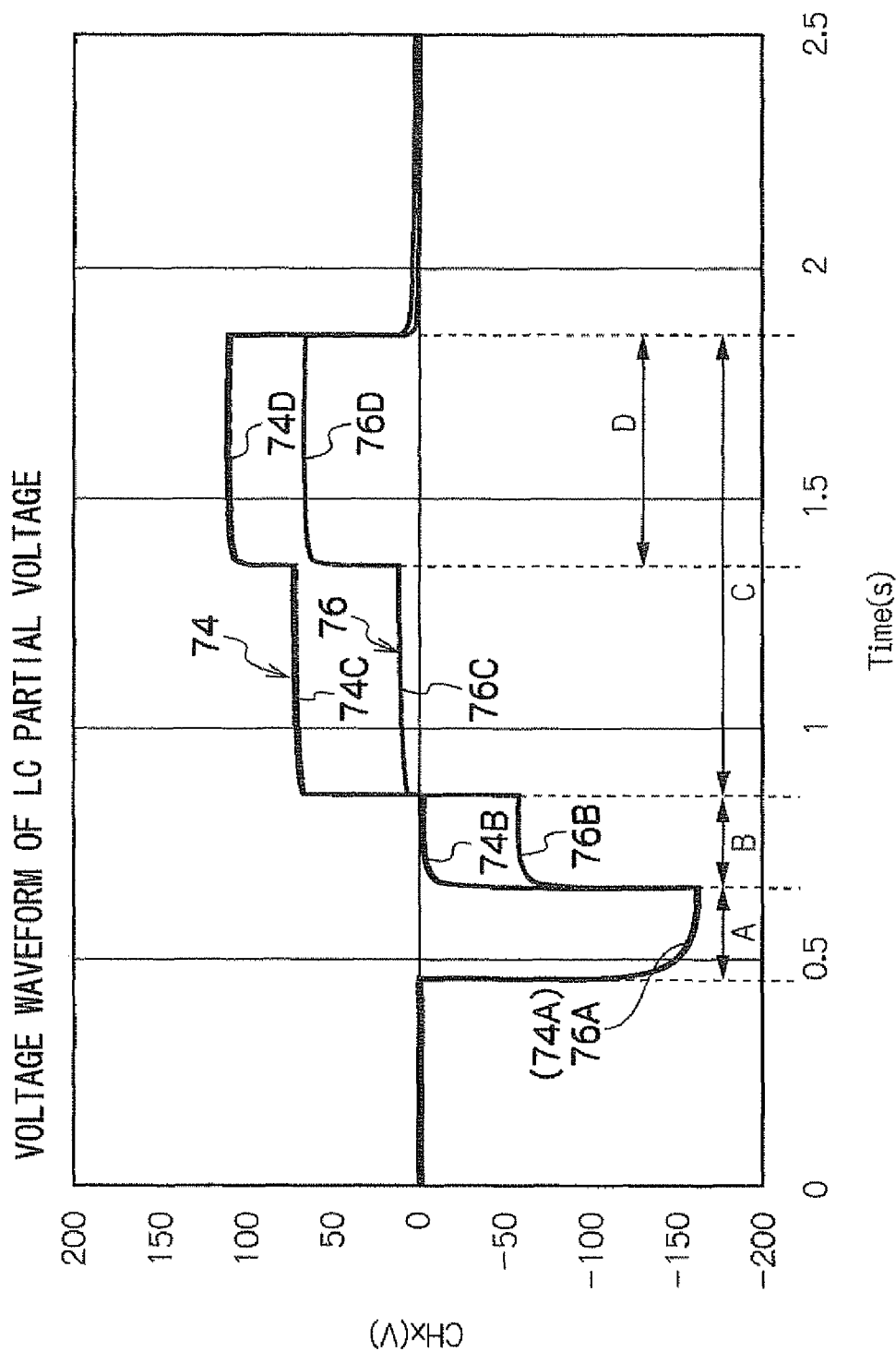
FIG. 8 is a diagrammatic view showing voltage waveforms of a partial voltage that is applied to the cholesteric liquid crystal layer measured in Example 1 and Comparative Example 1.

In Example 1, changes in the partial voltage applied to the capacitor during steps 100 to 120 as measured exhibit a voltage waveform 74 shown in FIG. 8. Since the changes in the partial voltage applied to the capacitor are nearly similar to those in the partial voltage applied to the liquid crystal layer in the display medium, the change behavior of the partial voltage applied to the liquid crystal layer may be estimated from the changes in the partial voltage applied to the capacitor.

As shown in voltage waveform 74, after the exposure light has been emitted in the first initialization process and the voltage having a polarity opposite to that of the voltage used in writing has been applied for a predetermined time (period A in FIG. 8) (diagrammatic view 74A), the partial voltage applied to liquid crystal layer 17 is zero by stopping the voltage application for a predetermined time while continuing to emit the exposure light in the second initialization process (period B in FIG. 8) (diagrammatic view 74B). Therefore, the partial voltage is increased to more than the upper threshold voltage by conducting the voltage application and exposure in the following writing process (period C in FIG. 8) (diagrammatic view 74D).

Accordingly, in the writing process, the residual potential that has been generated in the first initialization process (diagrammatic view 74A) has disappeared in the second initialization process (diagrammatic view 74B), and thus the partial voltage more than the upper threshold voltage is applied to the exposed portion of liquid crystal layer 17 in the writing process (diagrammatic view 74D).

After conducting the processes of steps 100 to 120 in Example 1, display medium 12 is in a planar state in which the entire surface thereof exhibits a white color.

Additionally, after repeating the processes of steps 100 to 120 for a hundred times, display medium 12 exhibits a white color with a reflectance that is as high as that shown prior to repeating the above process for a hundred times.

Consequently, according to Example 1, it is found that even when an image is repeatedly displayed on the optical writing display medium for a number of times, reduction in light sensitivity and deterioration in the liquid crystal layer may be suppressed, and thus deterioration in image quality may be suppressed.

Comparative Example 1

A writing process is carried out under similar conditions to that of Example 1, except that the exposure light is not emitted in the second initialization process. Specifically, the processes of steps 100 to 120 are performed under similar conditions to that of Example 1, except that a one-shot exposure instruction signal that is the same as the signal output in step 112 is output between the process of outputting the voltage application cancellation instruction signal in step 108 and the process of waiting for a predetermined time in step 110, and that the process of outputting a one-shot exposure cancellation instruction signal in step 112 is not performed between the process of waiting for a predetermined time in step 110 and the process of outputting a writing voltage application instruction signal in step 114.

In Comparative Example 1, the partial voltage applied to liquid crystal layer 17 during the processes of steps 100 to 120 is measured in a similar manner to Example 1, and a voltage waveform 76 shown in FIG. 8 is obtained.

As shown in voltage waveform 76, after a voltage having a polarity opposite to that of a voltage used in writing has been applied while irradiating with the exposure light for a predetermined time (period A in FIG. 8) in the first initialization process (diagrammatic view 76A), when the voltage application is stopped for a predetermined time (period B in FIG. 8) and the irradiation with the exposure light is stopped, the state of liquid crystal layer 17 changes to a non-exposed state and a residual potential is generated (diagrammatic view 76B).

Therefore, even if the voltage application and exposure are carried in the following writing process (period C in FIG. 8), the partial voltage of the exposed portion is lower than that shown in Example 1, which is less than the upper threshold voltage (diagrammatic view 76D).

This is considered to be because the residual potential that has been generated in the first initialization process (diagrammatic view 74A) does not disappear in the process of stopping the exposure while stopping the voltage application, the residual potential remains in the writing process (diagrammatic views 76C and 76D), and a partial voltage more than the upper threshold voltage is not applied to the exposed portion of liquid crystal layer 17.

Further, the image formed on display medium 12 by carrying out the processes of steps 100 to 120 in Comparative Example 1 exhibits a block color on the entire surface thereof, and it is confirmed that a black-and-white image is not formed even when exposure is conducted in an imagewise manner. This is considered to be because the partial voltage that exceeds the upper threshold is not applied to liquid crystal layer 17 by the exposure carried out in the writing process due to the effects of residual charges, and the state of liquid crystal layer 17 does not change to homeotropic even by the exposure and, as a result, the exposed portion of liquid crystal layer 17 does not change from homeotropic to planar after stopping the voltage application.

Example 2

(Exposure is Conducted in First and Second Initialization Processes, and Writing Process)

Figure 9:
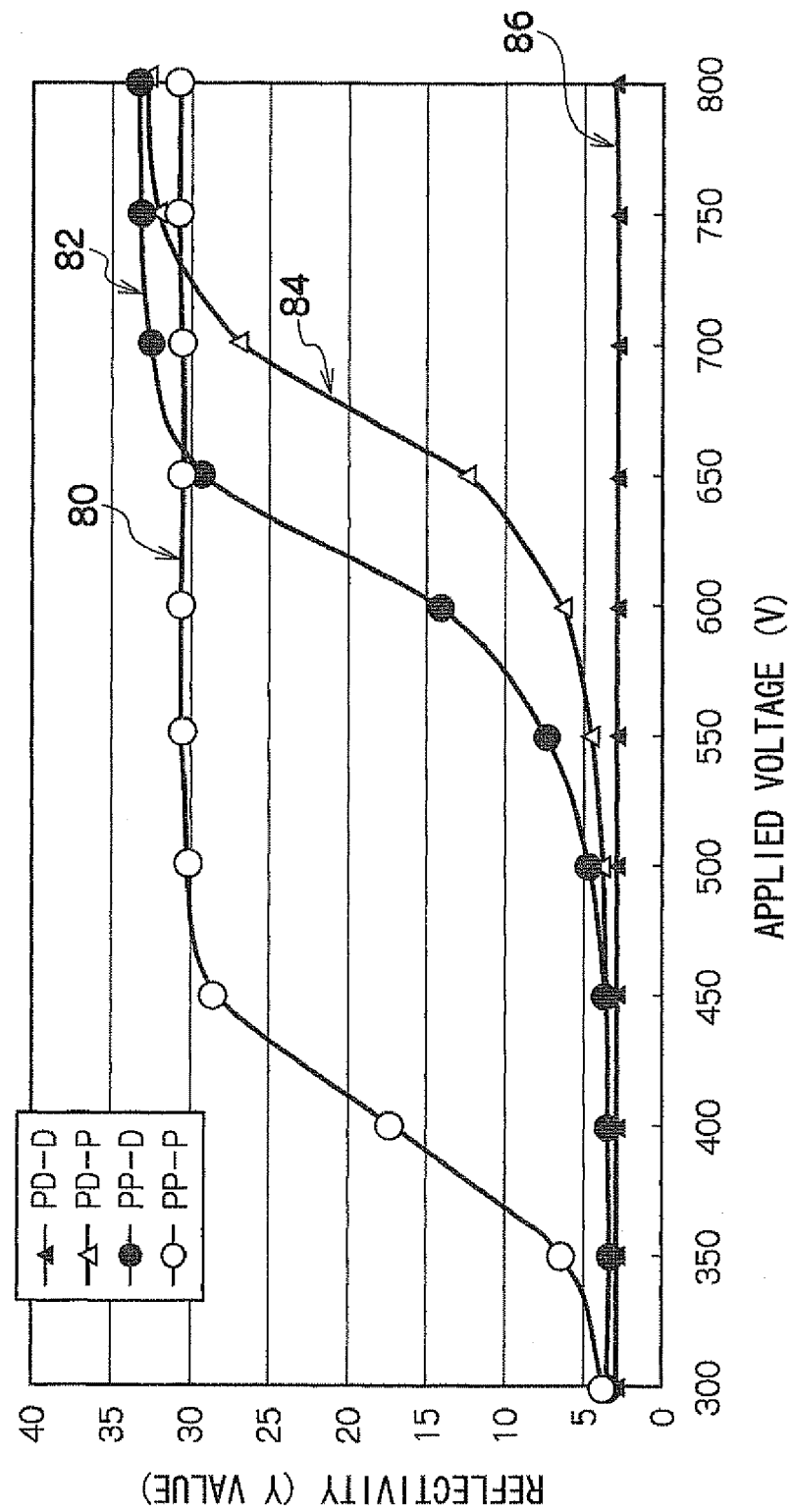
FIG. 9 is a schematic diagram showing a voltage to be applied to the display medium at the time of a writing process and a reflectance of the display medium measured at the time when the voltage that has been applied is canceled, measured in Examples 2 and 3 and Comparative Examples 2 and 3.

Example 2 is conduced by changing the value of the voltage applied in Example 1 in response to the voltage application instruction signal output in step 114 (writing process), and the relationship between the applied voltage at each voltage value and the reflectance of display medium 12 is measured. The voltage value is applied to electrode 15 as the anode and electrode 22 as the cathode, and the voltage value is increased from 300 V to 800 V by 50 V increments in the writing process. Then, the reflectance (luminous reflectance) of display medium 12 when the application of voltage of each value is stopped after the application thereof is measured using a spectral colorimeter (trade name: CM-2022, manufactured by Konica Minolta Holdings, Inc.) The results are shown in FIG. 9 (diagrammatic view 80).

Example 3

(Exposure is Conducted in First and Second Initialization Processes, but Not Conducted in Writing Process)

Example 3 is conduced by changing the value of the voltage applied in Example 1 in response to the voltage application instruction signal output in step 114 (writing process) but not conducing the exposure in the writing process (steps 116 and 118 are not conducted), and the relationship between the applied voltage at each voltage value and the reflectance of display medium 12 is measured. The voltage value is applied to electrode 15 as the anode and electrode 22 as the cathode, and the voltage value is increased from 300 V to 800 V by 50 V increments in the writing process. Then, the reflectance of display medium 12 when the application of voltage of each value is stopped after the application thereof is measured in a similar manner to Example 2. The results are shown in FIG. 9 (diagrammatic view 82).

Comparative Example 2

(Exposure is Conducted in First Initialization Process but Not Conducted in Second Initialization Processes, and Conducted in Writing Process)

Comparative Example 2 is conduced by changing the value of the voltage applied in Example 1 in response to the voltage application instruction signal output in step 114 (writing process) but not conducing the exposure in the second initialization process, similarly to Comparative Example 1, and the relationship between the applied voltage at each voltage value and the reflectance of display medium 12 is measured. The voltage value is applied to electrode 15 as the anode and electrode 22 as the cathode, and the voltage value is increased from 300 V to 800 V by 50 V increments in the writing process. Then, the reflectance of display medium 12 when the application of voltage of each value is stopped after the application thereof is measured in a similar manner to Example 2. The results are shown in FIG. 9 (diagrammatic view 84).

Comparative Example 3

(Exposure is Conducted in First Initialization Process, but Not Conducted in Second Initialization Processes and Writing Process)

Comparative Example 3 is conduced by changing the value of the voltage applied in Example 1 in response to the voltage application instruction signal output in step 114 (writing process) but not conducing the exposure in the second initialization process, similarly to Comparative Example 1, or in the writing process (processes in steps 116 and 118 are not conducted) and the relationship between the applied voltage at each voltage value and the reflectance of display medium 12 is measured. The voltage value is applied to electrode 15 as the anode and electrode 22 as the cathode, and the voltage value is increased from 300 V to 800 V by 50 V increments in the writing process. Then, the reflectance of display medium 12 when the application of voltage of each value is stopped after the application thereof is measured in a similar manner to Example 2. The results are shown in FIG. 9 (diagrammatic view 86).

As shown in FIG. 9, no change in the reflectance of display medium 12 in Comparative example 3 is shown where the exposure is conducted in the first initialization process, but not conducted in the second initialization process and the writing process, even when the voltage applied between the electrodes at the time of writing is increased up to 800 V (diagrammatic view 86).

On the other hand, changes in the reflectance are observed in Examples 2 and 3 and Comparative example 2 as the voltage applied between the electrodes at the time of writing is increased (diagrammatic views 80, 82, and 84). It is found that the voltage value at which changes in the reflectance occurs decreases in the order of from diagrammatic view 84 (Comparative Example 2), diagrammatic view 82 (Example 3) and diagrammatic view 80 (Example 2).

As described above, it is found that even when the same display medium 12 is used, favorable light sensitivity of display medium 12 may be achieved by employing a writing method including a first initialization process of applying a voltage having a polarity opposite to that of the voltage used in writing and conducting exposure; a second initialization process of stopping the voltage application for a predetermined time and conducting the exposure at the same time; and a writing process of applying a voltage having a polarity opposite to that of the voltage applied in the first initialization process and conducting scan-exposure, as compared to the other cases.

Example 4

Figure 10:
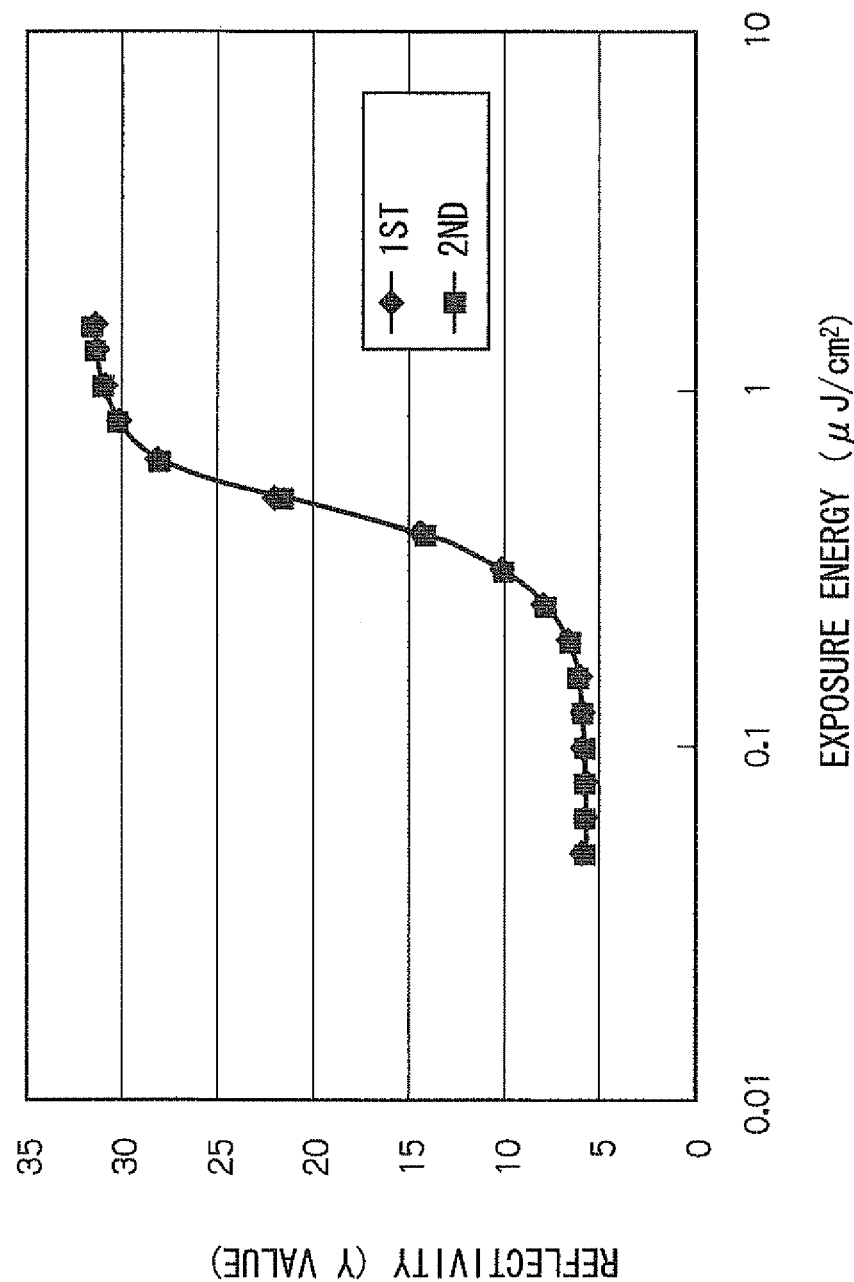
FIG. 10 is a diagrammatic view showing the relationship between the exposure energy and the reflectance measured in Example 4.

In the writing process of the invention carried out in Example 2, changes in the reflectance of display medium 12 are measured twice by increasing the intensity of exposure light emitted in the writing process from 0.06 μJ/cm$^2$ to 1.3 μJ/cm$^2$ while maintaining the voltage applied in the writing process at 500 V, and the results are shown in FIG. 10.

As shown in FIG. 10, the result obtained in the first measurement is substantially similar to the result obtained in the second measurement, which indicates that the writing method of the invention achieves excellent repetitive stability even when the exposure energy is changed.

All publications, patent applications, and technical standards mentioned in this specification are herein incorporated by reference to the same extent as if each individual publication, patent application, or technical standard was specifically and individually indicated to be incorporated by reference.

What is claimed is:

1. An optical writing display apparatus comprising:
   a display medium comprising, between a pair of electrodes, a photoconductive layer comprising a first charge generating layer, a charge transporting layer and a second charge generating layer, and a cholesteric liquid crystal;
   a voltage application unit that applies a voltage to the pair of electrodes;
   an exposure unit that exposes the photoconductive layer to an exposure light;
   a one-shot exposure unit that exposes at one time the entire photoconductive layer to an exposure light; and
   a control unit that performs:
   a first initialization process including controlling the voltage application unit to apply a first voltage having a first polarity to the pair of electrodes, the first voltage applying a first partial voltage to the cholesteric liquid crystal layer, the first partial voltage being more than a threshold at which the state of the cholesteric liquid crystal layer changes from focal conic to homeotropic when the exposure is conducted, and controlling the one-shot exposure unit to irradiate the photoconductive layer with the exposure light;
   a second initialization process including controlling the voltage application unit to stop the application of the first voltage to the pair of electrodes for a predetermined time and controlling the one-shot exposure unit to expose the photoconductive layer while the application of the first voltage is stopped; and
   an image writing process including controlling the voltage application unit to apply to the pair of electrodes a second voltage having a second polarity opposite to the first polarity, the second voltage applying a second partial voltage to the cholesteric liquid crystal layer, the second partial voltage being not more than a threshold at which the state of the cholesteric liquid crystal layer changes from focal conic to homeotropic when the exposure is not conducted, but more than the threshold when the exposure is conducted, controlling the exposure unit to selectively irradiate with the exposure light a portion of the photoconductive layer corresponding to a portion of the cholesteric liquid crystal layer on which an image is to be formed or an image is not to be formed, and controlling the voltage application unit to stop the application of the second voltage to the pair of electrodes.

2. The optical writing display apparatus according to claim 1, wherein the photoconductive layer contacts one of the pair of electrodes, and the first or second charge generating layer of the photoconductive layer that contacts the one of the pair of electrodes includes a charge generating material that is dispersed in a resin.

3. The optical writing display apparatus according to claim 2, wherein the charge generating material comprises a phthalocyanine pigment.

4. The optical writing display apparatus according to claim 2, wherein the resin comprises a polyvinyl acetal resin.

5. The optical writing display apparatus according to claim 1, wherein the exposure unit comprises: an exposure device including an array bar in which LEDs are arranged in a line; and a driving device that scan-drives the exposure device.

6. A optical writing device that writes an image to a display medium, the display medium comprising, between a pair of electrodes, a photoconductive layer comprising a first charge generating layer, a charge transporting layer and a second charge generating layer, and a cholesteric liquid crystal, the optical writing device comprising:
   a voltage application unit that applies a voltage to the pair of electrodes;
   an exposure unit that exposes the photoconductive layer to an exposure light; and
   a one-shot exposure unit that exposes at one time the entire photoconductive layer to an exposure light; and
   a control unit that performs:
   a first initialization process including controlling the voltage application unit to apply a first voltage having a first polarity to the pair of electrodes, the first voltage applying a first partial voltage to the cholesteric liquid crystal layer, the first partial voltage being more than a threshold at which the state of the cholesteric liquid crystal layer changes from focal conic to homeotropic when the exposure is conducted, and controlling the one-shot exposure unit to irradiate the photoconductive layer with the exposure light;
   a second initialization process including controlling the voltage application unit to stop the application of the first voltage to the pair of electrodes for a predetermined time and controlling the one-shot exposure unit to expose the photoconductive layer while the application of the first voltage is stopped; and
   an image writing process including controlling the voltage application unit to apply to the electrodes a second voltage having a second polarity opposite to the first polarity, the second voltage applying a second partial voltage to the cholesteric liquid crystal layer, the second partial voltage being not more than a threshold at which the state of the cholesteric liquid crystal layer changes from focal conic to homeotropic when the exposure is not conducted, but more than the threshold when the exposure is conducted, controlling the exposure unit to selectively irradiate with the exposure light a portion of the photoconductive layer corresponding to a portion of the cholesteric liquid crystal layer on which an image is to be formed or an image is not to be formed, and controlling the voltage application unit to stop the application of the second voltage to the pair of electrodes.

7. An optical writing method of writing an image to a display medium, the display medium comprising, between a pair of electrodes, a photoconductive layer comprising a first charge generating layer, a charge transporting layer and a second charge generating layer, and a cholesteric liquid crystal, the optical writing method comprising:
   performing a first initialization process including applying a first voltage having a first polarity to the pair of electrodes, the first voltage applying a first partial voltage to the cholesteric liquid crystal layer, the first partial voltage being more than a threshold at which the state of the cholesteric liquid crystal layer changes from focal conic to homeotropic when an exposure is conducted, and irradiating at one time the entire photoconductive layer with an exposure light;

performing a second initialization process including stopping the application of the first voltage to the pair of electrodes for a predetermined time and exposing at one time the entire photoconductive layer while the application of the first voltage is stopped; and performing an image writing process including applying to the pair of electrodes a second voltage having a second polarity opposite to the first polarity, the second voltage applying a second partial voltage to the cholesteric liquid crystal layer, the second partial voltage being not more than a threshold at which the state of the cholesteric liquid crystal layer changes from focal conic to homeotropic when the exposure is not conducted, but more than the threshold when the exposure is conducted, selectively irradiating with the exposure light a portion of the photoconductive layer corresponding to a portion of the cholesteric liquid crystal layer on which an image is to be formed or an image is not to be formed, and stopping the application of the second voltage to the pair of electrodes.

* * * * *